(12) United States Patent
Watanabe et al.

(10) Patent No.: US 8,564,805 B2
(45) Date of Patent: Oct. 22, 2013

(54) PRINTING SYSTEM AND COMPUTER USABLE MEDIUM THEREFOR

(75) Inventors: Satoshi Watanabe, Kasugai (JP); Kazuma Aoki, Kasugai (JP); Kiyotaka Ohara, Nagoya (JP); Makoto Matsuda, North Brunswick, NJ (US); Masashi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1653 days.

(21) Appl. No.: 11/586,629

(22) Filed: Oct. 26, 2006

(65) Prior Publication Data

US 2007/0110492 A1    May 17, 2007

(30) Foreign Application Priority Data

Oct. 31, 2005   (JP) ................. 2005-317054

(51) Int. Cl.
*G06F 3/12* (2006.01)
(52) U.S. Cl.
USPC .......... 358/1.15; 358/1.13; 358/3.28
(58) Field of Classification Search
USPC ...................... 358/1.15, 1.13, 3.28
See application file for complete search history.

(56) References Cited

U.S. PATENT DOCUMENTS

| | | | |
|---|---|---|---|
| 5,870,767 A | 2/1999 | Kraft, IV | |
| 2003/0016387 A1* | 1/2003 | Takagi et al. | 358/1.15 |
| 2003/0053122 A1* | 3/2003 | Kinoshita | 358/1.15 |
| 2003/0061380 A1* | 3/2003 | Saito et al. | 709/238 |
| 2003/0236713 A1* | 12/2003 | Kuwabara et al. | 705/26 |
| 2004/0100648 A1* | 5/2004 | Kulakowski | 358/1.13 |
| 2005/0052695 A1* | 3/2005 | Fukunaga et al. | 358/1.15 |
| 2005/0114772 A1* | 5/2005 | Talley et al. | 715/541 |
| 2006/0126113 A1* | 6/2006 | Narazaki | 358/1.15 |

FOREIGN PATENT DOCUMENTS

| | | |
|---|---|---|
| JP | A-6-342426 | 12/1994 |
| JP | A 9-204389 | 8/1997 |
| JP | A-10-162030 | 6/1998 |
| JP | A-11-203381 | 7/1999 |
| JP | A-2001-60198 | 3/2001 |
| JP | A 2002-82853 | 3/2002 |
| JP | A 2002-111909 | 4/2002 |

OTHER PUBLICATIONS

Wayback, Get Clues from URLs, Nov. 10, 1999, http://www.hennigweb.com/projects/webclass/urls.html.*

* cited by examiner

*Primary Examiner* — Qian Yang
*Assistant Examiner* — Martin Mushambo
(74) *Attorney, Agent, or Firm* — Oliff & Berridge, PLC

(57) ABSTRACT

A printing system, comprising a detecting system, which detects from a content to be printed a link destination address as an address assigned to information being associated with the content, a code symbol generating system, which generates a code symbol representing the link destination address detected by the detecting system in a format recognizable to a code symbol reader, a print control system, which controls the code symbol generated by the code symbol generating system to be appended to the content and a printer unit included in the print control system to print the contents along with the appended code symbol.

14 Claims, 18 Drawing Sheets

PRINTING SYSTEM AND COMPUTER USABLE MEDIUM THEREFOR

CROSS REFERENCE TO RELATED APPLICATION

This application claims priority from Japanese Patent Application No. 2005-317054, filed on Oct. 31, 2005, the entire subject matter of which is incorporated herein by reference.

BACKGROUND

1. Technical Field

Aspects of the present invention relate to a printing system for printing an image of content information including an object linked to an address which indicates another content information and a program for configuring the printing system by using a computer capable of controlling the printing system which prints the image on a recording medium.

2. Related Art

In recent years, the Internet as a communication network is widely spread to general consumers who receive benefit of obtaining desired information by accessing numerous web pages that publishes various information. Some information on the web pages is often linked to another web page that may be relevant to the information, and when a user viewing the information by using web browser software clicks a predetermined portion of a screen shown in the web browser, the screen is swiftly switched to the linked web page. More specifically, for example, an advertising method called banner advertisement is widely used in the Internet. A banner in the banner advertisement is an image shown on a web page, which is linked to another web page. Generally, the banner itself indicates merely a limited amount of information, although the web page linked with the banner shows detailed advertising information so that the user who is interested in the information shown on the banner can easily access to the detailed advertising information by designating (clicking) the banner.

For another example of an advertising method using the Internet, a URL (uniform resource locater) indicating an address of the advertising web page is provided on printed matters such as magazines and flyers so that the user can input the URL in the web browser to access the advertising web page to view the advertisement.

Further, a technique that allows the user to access the advertising web page by reading a bar-code symbol provided on a printed manner with a bar-code reader is disclosed in Japanese Patent Provisional Publication No. HEI9-204389. With the technique, the user can easily inputs the bar-code symbol by using the bar-code reader to access the desired web page rather than manually inputting the URL in the web browser.

SUMMARY OF THE INVENTION

Aspects of the present invention are advantageous in that a printing system capable of printing an image representing content information which includes an address of relevant information linked with the content information wherein accessibility to the linked address is attained, is provided. Further, a program product for configuring the printing system is provided.

BRIEF DESCRIPTION OF THE ACCOMPANYING DRAWINGS

DETAILED DESCRIPTION

General Overview

Figure 1:
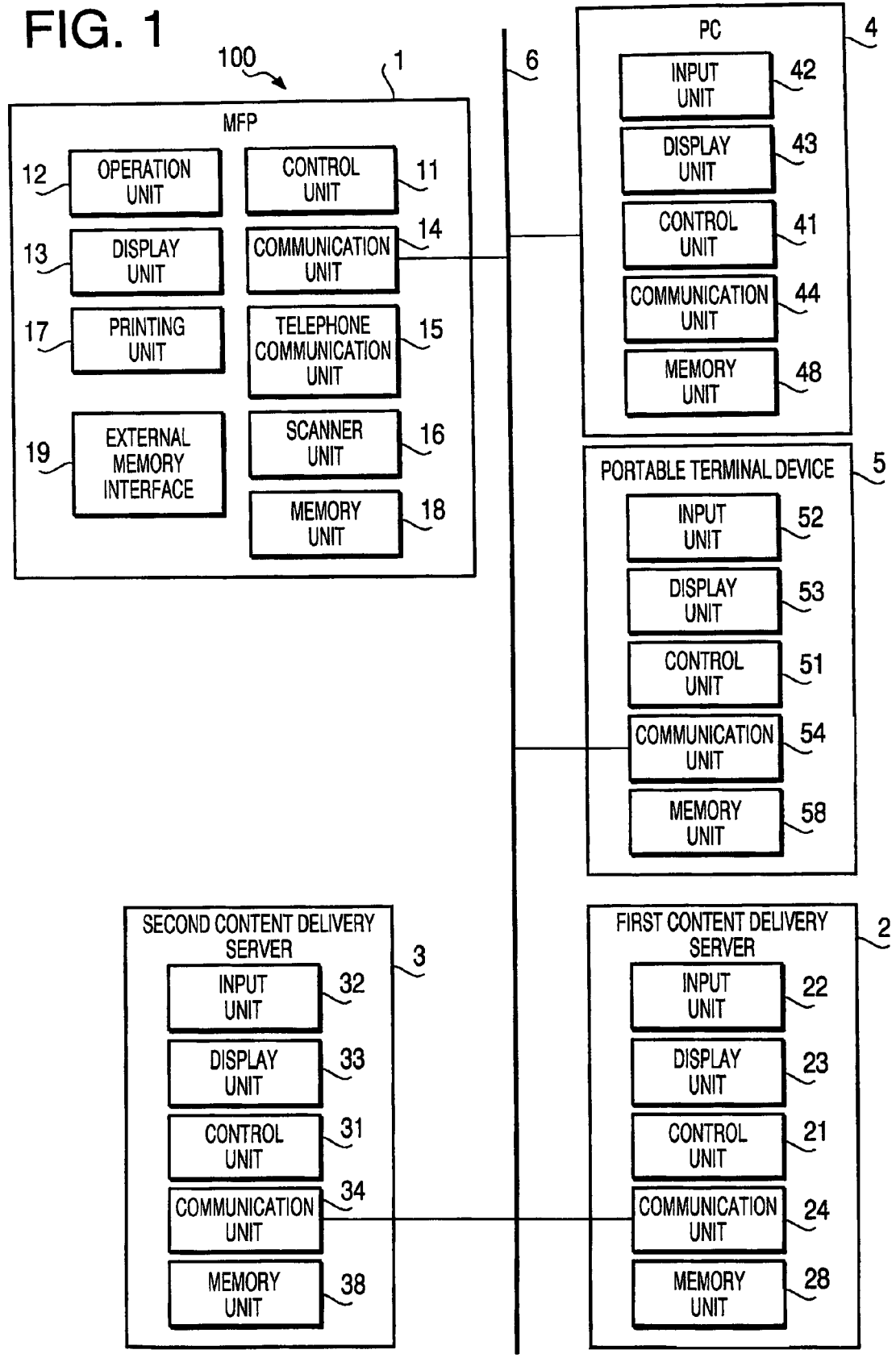
FIG. 1 is a block diagram showing a network system having an MFP (multi-function peripheral) with a printing system according to an embodiment of the invention.

The following describes general aspects of the invention that may or may not be included in various examples and modifications. It should be noted that various connections are set forth between elements in the following description. It should be noted that these connections in general and, unless specified otherwise, may be direct or indirect and that this specification is not intended to be limiting in this respect.

According to some aspects of the invention, there is provided a printing system, comprising a detecting system, which detects from a content to be printed a link destination address as an address assigned to information being associated with the content, a code symbol generating system, which generates a code symbol representing the link destination address detected by the detecting system in a format recognizable to a code symbol reader, a print control system, which controls the code symbol generated by the code symbol generating system to be appended to the content and a printer unit included in the print control system to print the contents along with the appended code symbol.

According to the above configuration, when the content is printed out, the code symbol representing the link destination address contained in the content is appended in a printed output. Therefore, when no code symbol representing the link destination address is previously included in the content data, information regarding the link destination can be prevented from being lost as the content is printed out. Thus, as the code symbol is read by the code symbol reader, the information associated with the content can be easily accessed based on the link destination address represented by the code symbol.

In the printing system described above, a format of the code symbol is not limited, as long as the link destination address represented in the code symbol can be recognized by the code symbol reader. For example, the code symbol may be a one-dimensional barcode symbol such as JAN (Japan Article Number) code standardized by JIS (Japan Industrial Standard)-X-0501 or a two dimensional code symbol such as QR Code™ standardized by JIS-X-0510.

The detecting system, the code symbol generating system, and the print control system included in the printing system may be configured with a computer capable of controlling a printer unit which prints an image on a recording medium and software to operate the computer to server as each of the detecting system, the code symbol generating system, and the print control system. Further, one ore more of the detecting system, the code symbol generating system, and the print control system may be configured in specialized devices which are unlike a computer for general use.

Further, the detecting system, the code symbol generating system, and the print control system in the printing system and the printer unit to be controlled by the detecting system, the code symbol generating system, and the print control system may be included in one device unit, although the printing system may be configured in one unit and the printer unit is included in another device unit while the printing system and the printer unit are interconnected via a communication interface.

For example, a printer unit having a printing mechanism and a microcomputer to control the printing mechanism may be used by operating the microcomputer as the detecting system, the code symbol generating system, and the print control system in the printing system of the present invention. In this case, both of the printing system and the printer unit to be controlled by the printing system are included in one device unit. Further, a computer system having a printer with a printing mechanism and a PC having with a CPU to control the printer may be used by operating the CPU as detecting system, the code symbol generating system, and the print control system in the printing system of the present invention. In this case, the printing system in the present invention is included in the PC and the printer unit to be controlled by the printing system is included in a printer that is individual from the PC, while the PC and the printer are interconnected via a communication interface.

A device having the printer unit to be controlled by the printing system may be configured as a single-function apparatus having a printing function or a multifunction apparatus having a plurality of functions, as long as the apparatus is provided with the printing function. More specifically, the multifunction apparatus may be a copier, a facsimile machine, or an MFP having one or more of a scanner function, a copying function, a facsimile transmission/reproduction function, a telecommunication function, and a network communication function in addition to the printing function.

Optionally, the printing system may further comprise an address judging system, which judges as to whether an address assigned to the content to be printed as a link source address and the link destination address respectively indicate locations in different servers. The code symbol generating system may generate the code symbol when the address judging system judges that the link source address and the link destination address respectively indicate locations in different servers.

According to the above configuration, when the content to be printed and the information associated with the content are stored in a same server at a same address, it can be prevented that an excessive number of code symbols are appended in the content to be printed. In addition, it should be noted that the content as the link source to be printed is obtained by the user, therefore it may be easier to remember the link source address later in order to access the server storing the content when the user desires to obtain the content as the link source. On the other hand, the information associated with the content are often stored in a different server from the server wherein the content is stored, in which case the user may have difficulties to remember the link destination address. Thus, with the code symbol representing the link destination address of the different server, the user can ensure the link destination address of the server which may be difficult to remember. Furthermore, the link destination address is often changed to another address. In such a case, with the code symbol representing the link destination address being appended and printed, the link destination address before the change can be saved on the printed output.

Optionally, the printing system may further comprise an existing code symbol judging system, which judges as to whether a code symbol representing the link destination address detected by the detecting system in the format recognizable to the code symbol reader exists in the content. The code symbol generating system may generate a code symbol representing the link destination address in the format recognizable to the code symbol reader when the existing code symbol judging system judges that the code symbol does not exist in the content.

According to the above configuration, when the code symbol already exists in the content, it can be prevented that redundant code symbols are unnecessarily appended to the content so that the user can view a printed output organized more efficiently.

The existing code symbol judging system may limit a type of the code symbol to be judged to a specific standard of code symbol that is the same as the code symbol generated by the code symbol generating system so that it is judged that the code symbol of the specific standard can be examined and judged by the existing code symbol judging system. Alternatively, a code symbol of a specific standard that is different from the standard wherein of the code symbol generated by the code symbol generating system may be examined and judged by the existing code symbol judging system.

According to the above configuration, when the code symbol generating system is configured to generate exclusively a two-dimensional code symbol, for example, the existing code symbol judging system may judge as to whether a two-dimensional code symbol exists. In this case, the code symbol generating system generates a two-dimensional code even if a one-dimensional code symbol is already provided in the content. Furthermore, the existing code symbol judging system may be configured to judge as to whether a two-dimensional code in a same standard as the code symbol that the code symbol generating system generates and a one-dimensional barcode symbol in a different standard from the code symbol that the code symbol generating system generates exist in the content. In this case, the code symbol generating system does not generate the two-dimensional code symbol when the one-dimensional barcode symbol that is in the different standard from the two-dimensional code symbol is already provided in the content.

Optionally, the print control system may append the code symbol generated by the code symbol generating system in a position wherein the code symbol accompanies an object in the content with the link destination address attached thereto and may control the printer unit to print the content along with the appended code symbol.

According to the above configuration, the code symbol and the object are provided in an area wherein the code symbol accompanies the object so that the correspondence between the code symbol and the object can be easily recognized to identify the code symbol representing a desired link destination address.

Optionally, the print control system may append the code symbol generated by the code symbol generating system in an area which is different from an area wherein the content is provided and may control the printer unit to print the content along with the appended code symbol.

According to the above configuration, the code symbol is printed in an area different from an area wherein the content is printed so that the user should not fail to find the code symbol. Further, the content may be provided in an organized manner on the printed output without being interfered by the code symbols.

Optionally, the print control system may append reference symbols indicating a correspondence between an object with the link destination address attached thereto and the code symbol generated by the code symbol generating system respectively to the object and the code symbol and may control the printer unit to print the content along with the code symbol and the reference symbols.

According to the above configuration, the reference symbols indicating the correspondence between the object and the code symbol are appended in the content so that the user can easily recognize the correspondence.

According to some aspects of the invention, there is provided a computer usable medium comprising computer readable instructions for controlling a computer to execute steps of detecting from a content to be printed a link destination address as an address assigned to information being associated with the content, generating a code symbol representing the link destination address detected in the detecting step in a format recognizable to a code symbol reader, and controlling the code symbol generated in the code symbol generating step to be appended to the content and a printer unit included in the print control system to print the contents along with the appended code symbol.

According to the above configuration, the printing system having the detecting system, the code symbol generating system, and the print control system described above can be configured by using a computer capable of controlling the print unit that prints an image on a recording medium.

It is preferable that computer readable instructions for the printing system of the present invention is configured as a program for a computer to operate as the printing system described above. With this configuration, the computer can be operated as the printing system as described above.

DETAILED DESCRIPTION

Hereinafter, referring to accompanying drawings, an embodiment of the present invention will be described. First, referring to FIG. 1, a configuration of an entire network system having an MFP with a printing system according to the embodiment of the invention will be described.

As shown in FIG. 1, a network system 100 includes an MFP 1, a first content delivery server 2, a second content delivery server 3, a PC (personal computer) 4, and a portable terminal device 5, which are communicably connected to each other through a network 6.

The MFP 1 is a device having a plurality of functions such as a telephone (audio communication) function, a scanning function, a printing function, a copying function, a facsimile transmission/reproduction function. With the printing function of the MFP 1, when the PC 4 accesses the first content delivery server 2 to obtain information as a first content and transmits the same to the MFP 1, the PC 4 can have the MFP 1 to print an image representing the first content. It should be noted that the MFP 1 is provided with a network communicating function, whereby the MFP 1 is allowed to access the first content delivery server 2 and the second content delivery server 3 based on an instruction provided by the user so that the MFP 1 can obtain information as a content delivered from the servers and output (print out) the obtained content information as an image.

It should be noted that the first content delivery server 2 and the second content delivery server 3 represent numerous web servers that exist on the network 6 as examples. In the present embodiment, the first content delivery server 2 distributes the first content information and the second content delivery server 3 distributes the second content information, while the first content information includes an object such as a banner advertisement linked to the second content.

The PC 4 and the portable terminal device 5 are terminal devices with which a user can view the content delivered from the web servers including the first content delivery server 2 and the second content delivery server 3. The data that represents the content is output to the MFP 1, and thereby the MFP 1 is instructed to print the content.

The network 6 comprises a LAN (Local Area Network) and a WAN (Wide Area Network) such as the Internet. The network 6 is provided with a plurality of relaying devices having functions as a gateway and a router at various relaying points. However, such a configuration of the network 6 is known and is not essential to the present invention. Therefore, in FIG. 1, the LAN and the WAN are not specifically shown, and the relaying devices are omitted.

Next, a configuration of the MFP 1 will be described. The MFP 1 includes a control unit 11, an operation unit 12, a display unit 13, a communication unit 14, a telecommunication unit 15, a scanner unit 16, a printing unit 17, a memory unit 18, and an external memory interface 19.

The control unit 11 includes a known CPU, a known ROM, and a known RAM. As the control unit 11 executes a process, which will be described later, according to a program stored in the ROM, and thereby each the other units of the MFP is controlled. A part of the program is stored in a rewritable ROM (for example, a flash memory) so that the program can be updated when an updating program read through the communication unit 14 and the external memory interface 19 is read and written over the existing program.

The operation unit 12 includes an operation panel (not shown) with keys, through which the user can input various instructions. The keys of the operation panel includes, for example, a function key, a one-touch key, a direction key, an enter key, and a cancel key. The function key is used when major functions of the MFP 1 is used. The one-touch key is provided for a simplified operation, such as one-touch operation, wherein several operational steps can be composed to one operation according to a predetermined key assignment in order to achieve a function of the MFP 1. The direction key is used when a focus (i.e., a cursor) is moved into a desired direction in a display area of the display unit 13. The enter key is used when the user confirms an inputted operation. The cancel key is used when the user cancels the inputted operation.

The information to be viewed by the user is shown in the display unit 13, which is a color LCD (liquid crystal display) capable of displaying an object (i.e., a banner advertisement) included in the first content in a full-scale or in a reduced size in the present embodiment.

The communication unit 14 includes an interface between an interface device such as a NIC (Network Interface Card) and the network 6, through which the MFP 1 communicates with external devices.

The telecommunication unit 15 includes a modem, which communicates with external devices through a telephone line (not shown). The MFP 1 further includes a hand set (receiver), a built-in speaker, and an amplifier to be used with the telecommunication function.

The scanner unit 16 scans an image formed on an original document which is set in an ADF (automatic document feeder) or placed on a flatbed contact glass and generates data representing the scanned image. The scanner unit 16 is operated for example when the image is scanned and the scanned image is transmitted by using the facsimile function.

The printing unit 17 prints an image represented by image data which is generated for example by the scanner unit 16 on a recording medium such as recording paper. The printing unit 17 is operated for example when an image received by using the facsimile function is printed and an image generated by using the copying function.

The memory unit 18 includes an HDD (hard disk drive), wherein information required for operating the MFP 1 is stored. The external memory interface 19 is provided so that the MFP 1 accesses a memory card (not shown). When the memory card is detachably attached to a card slot of the MFP 1, the MFP 1 can access a data file stored in the memory card through the external memory interface 19.

Next, a configuration of the first content delivery server 2 will be described. The first content delivery server 2 includes a control unit 21, an input unit 22, a display unit 23, a communication unit 24, and a memory unit 25.

The control unit 21 includes a known CPU, a known ROM, and a known RAM. Within the control unit 21, software as a part of OS (operating system) and server software are loaded in the RAM, and the CPU executes various processes under control of the OS in accordance with the server software so that the other components of the first content delivery server 2 execute necessary processes in response to a request from a client such as the MFP 1, the PC 4, and the portable terminal device 5. Such processes executed in response to the request from the client include, for example, delivering a web page data as a content stored in the memory unit 28 of the first content delivery server 2 to a source of the request through the communication unit 24, dynamically generating web page data as a content in accordance with certain information stored in the memory unit 28 and delivering the generated web page data to the source of the request through the communication unit 24. In the present embodiment, the web page data generated in the processes is referred to as the first content, and an object (for example, a banner advertisement) linked to the second content is included in the first content.

The input unit 22 and the display unit 23 are units as user interfaces through which the user can administrate the first content delivery server 2. The input unit 22 includes a keyboard and a pointing device (i.e., a mouse) which are operated by the user to input various instructions. The display unit 23 includes an LCD.

The communication unit 24 includes an interface between an interface device such as a NIC and the network 6, through which the first content delivery server 2 communicates with external devices. The memory unit 28 includes an HDD (hard disk drive), wherein web page data and information required for dynamically generating the web page is stored.

Next, a configuration of the second content delivery server 3 will be described. The second content delivery server 3, which is similar to the first content delivery server 2 in its functionality, includes a control unit 31, an input unit 32, a display unit 33, a communication unit 34, and a memory unit 35.

The control unit 31 includes a known CPU, a known ROM, and a known RAM. Within the control unit 31, software as a part of OS and server software are loaded in the RAM, and the CPU executes various processes under control of the OS in accordance with the server software so that the other components of the second content delivery server 3 execute necessary processes in response to a request from a client such as the MFP 1, the PC 4, and the portable terminal device 5. Such processes executed in response to the request from the client include, for example, delivering a web page data as a content stored in the memory unit 38 of the second content delivery server 3 to a source of the request through the communication unit 34, dynamically generating web page data as a content in accordance with certain information stored in the memory unit 38 and delivering the generated web page data to the source of the request through the communication unit 34. In the present embodiment, the web page data generated in the processes is referred to as the second content.

The input unit 32 and the display unit 33 are units as user interfaces through which the user can administrate the second content delivery server 3. The input unit 32 includes a keyboard and a pointing device (i.e., a mouse) which are operated by the user to input various instructions. The display unit 33 includes an LCD.

The communication unit 34 includes an interface between an interface device such as a NIC and the network 6, through which the second content delivery server 3 communicates with external devices. The memory unit 38 includes an HDD, wherein web page data to be delivered as the second content and information required for dynamically generating the web page is stored.

Next, a configuration of the PC 4 will be described. The PC 4 includes a control unit 41, an input unit 42, a display unit 43, a communication unit 44, and a memory unit 45.

The control unit 41 includes a known CPU, a known ROM, and a known RAM. Within the control unit 41, BIOS (Basic Input Output System) and various essential setting data are stored in the ROM. In the RAM, software as a part of OS and various application programs are loaded from the memory unit 45. The CPU executes various processes in accordance with the programs stored in the ROM and the RAM so that the other components of the PC 4 execute necessary processes.

The input unit 42 includes a keyboard and a pointing device (i.e., a mouse) which are operated by the user to input various instructions. The display unit 43 includes an LCD.

The communication unit 44 includes an interface between an interface device such as a NIC and the network 6, through which the PC 4 communicates with external devices. The memory unit 48 includes an HDD, wherein the OS, various application programs, and various data files are stored.

Next, a configuration of the portable terminal device 5 will be described. The portable terminal device 5 includes a control unit 51, an input unit 52, a display unit 53, a communication unit 54, and a memory unit 55.

The control unit 51 includes a known CPU, a known ROM, and a known RAM. Within the control unit 51, BIOS and various essential setting data are stored in the ROM. In the RAM, software as a part of OS and various application programs are loaded from the memory unit 55. The CPU executes various processes in accordance with the programs stored in the ROM and the RAM so that the other components of the portable terminal device 5 execute necessary processes.

The input unit 52 includes a keyboard and a pointing device (i.e., a mouse) which are operated by the user to input various instructions. The display unit 53 includes an LCD.

The communication unit 54 includes an interface between an interface device such as a wireless LAN card, which provides accessibility to an access point on a wireless LAN, thorough which the portable terminal device 5 communicates with external devices. The memory unit 58 includes an HDD, wherein the OS, various application programs, and various data files are stored.

Figure 2:
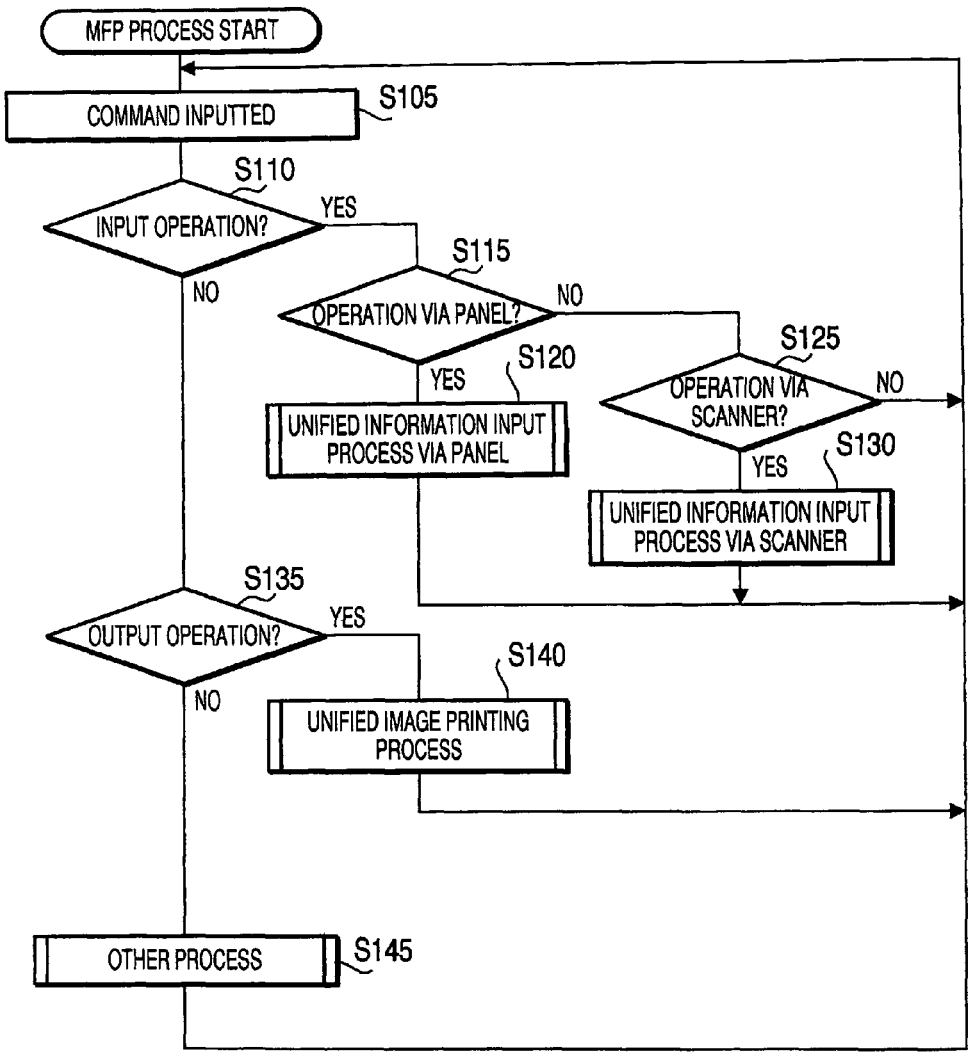
FIG. 2 is a flowchart to illustrate an MFP process according to the embodiment of the invention.

Next, referring to FIG. 2, an MFP process, which is executed by the MFP 1 with a function as a printing system of the present invention will be described. FIG. 2 is a flowchart to illustrate the MFP process according to the embodiment of the invention.

As the MFP process is started, in S105, the MFP 1 receives a command inputted by the user with a key operation through the operation unit 12. Alternatively, the user can obtain the command externally for example from the PC 4 and the portable terminal device 5 and input the command through the network 6.

Next, in S110, the MFP 1 examines as to whether the command is for an input operation. When it is judged that the command is for an input operation (S110: YES), in S115, the CPU examines as to whether the input operation is executed via the operation panel of the operation unit 12.

When it is judged that the input operation is executed via the panel (S115: YES), in S120, the CPU executes a unified information input process via panel, which will be described in detail hereinafter. When the unified information input process via panel is completed, the CPU returns to S105.

In S115, when it is judged that the input operation is not executed via the panel (S115: NO), in S125, it is examined as to whether the input operation is executed via the scanner unit 16. When it is judged that the input operation is executed via the scanner unit 16 (S125: YES), the CPU executes a unified information input process via scanner, which will be described in detail hereinafter. When the unified information input process via scanner is completed, the CPU returns to S105. In S125, when it is judged that the input operation is executed via the scanner (S125: NO), the CPU returns to S105.

In S110, when it is judged that the command is not for an input operation (S110: NO), in S135, the MFP 1 examines as to whether the command is for an output operation. When it is judged that the command is for an output operation (S135: YES), in S140, the CPU executes a unified image printing process, which will be described in detail hereinafter. When the unified image printing process is completed, the CPU returns to S105.

In S135, when it is judged that the command is not for an output operation (S135: NO), in S145, the MFP 1 executes the other process that is not directly concerned about the major configuration of the present invention, therefore explanation of such a process is omitted. When S145 is completed, the CPU returns to S105.

Within the MFP process as described above, the MFP 1 executes at least one of the unified information input process via panel, the unified information input process via scanner, the unified image printing process, and the other process.

Next, referring to FIGS. 3-14, the unified image printing process will be described in detail.

The unified image printing process is executed when the first content (a web page in the present embodiment) obtained from the first content delivery server 2 with linked information is printed on a recording medium. It should be noted that the first content to be printed may be obtained from the first content delivery server 2 by the MFP as a client, although the first content may be obtained from the first content delivery server 2 by another device such as the PC 4 and the portable terminal device 5 as a client which thereafter transmits the obtained first content to the MFP 1. The first content includes an image object called a banner advertisement (hereinafter referred to as an "object"), which is linked to an address of the second content including a web page with advertising information.

Figure 3:
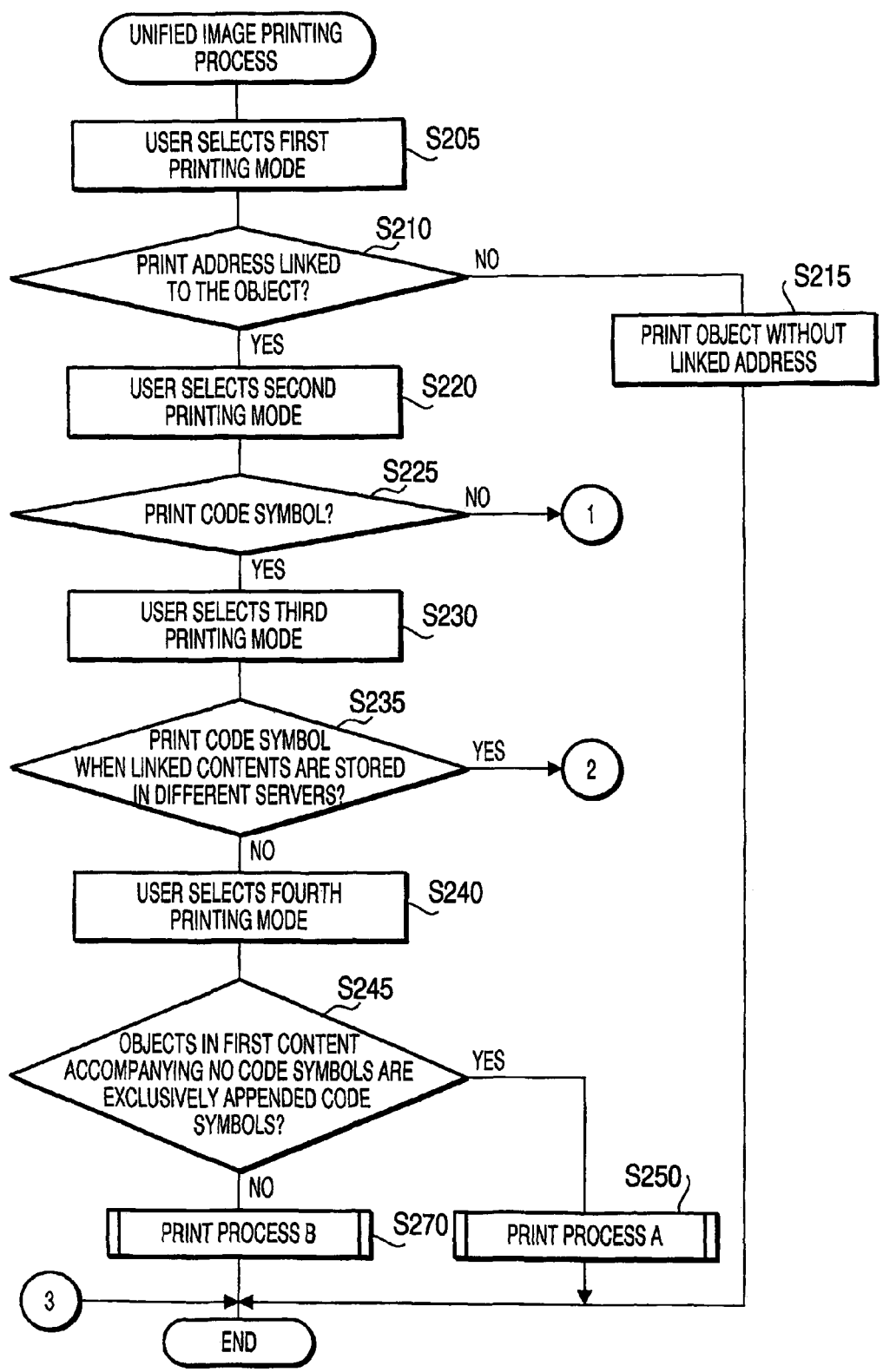
FIG. 3 is a flowchart to illustrate a first part of a unified image printing process according to the embodiment of the invention.

FIG. 3 is a flowchart to illustrate a first part of the unified image printing process according to the embodiment of the invention.

Figure 15A:
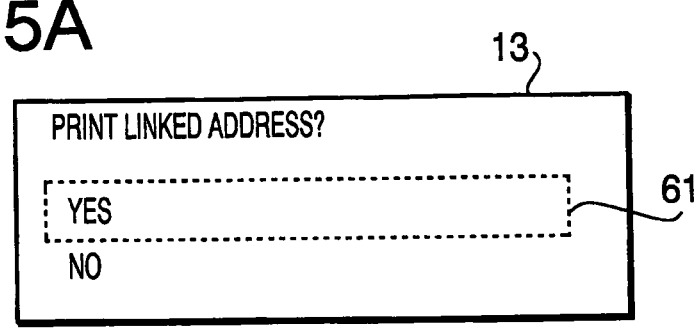
FIGS. 15A-15D are illustrative views of screens shown in a display unit according to the embodiment of the invention.

As the unified image printing process is started, in S205, the MFP 1 prompts the user to specify a first printing mode (see FIG. 15A). FIG. 15A is an illustrative view of a screen shown in the display unit 13 of the MFP 1 according to the embodiment of the invention. In S205, the MFP 1 displays the screen inquiring the user as to whether the linked address of the second content should be printed. More specifically, a question "Print linked address?" along with options "YES" and "NO" is displayed in the display unit 13. In this stage, the user can select as to whether the address of the second content linked with the object is printed by operating the direction key of the operation unit 12 and specifying "YES" or "NO" with a focus 61. When the selection is made, the CPU proceeds to S210.

In S210, the MFP 1 examines as to whether the address linked with the object should be printed based on the selection made in S205. In S205, if the user has selected "NO", it is judged in S210 that the address should not be printed (S210: NO). Thereafter, in S215, the MFP 1 prints the first content including the object, but not the address linked with the object, and terminates the unified image printing process.

Figure 15B:
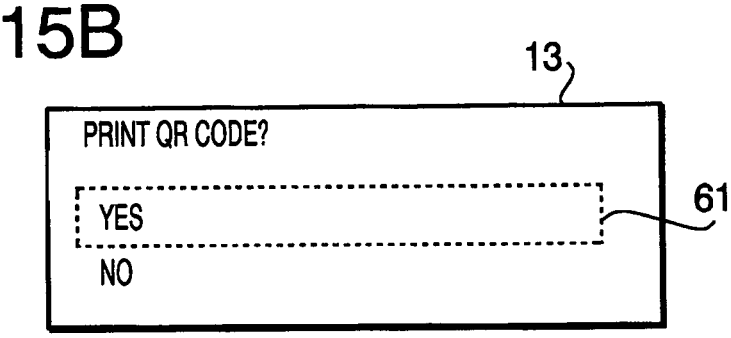

In S205, if the user has selected "YES", it is judged in S210 that the address should be printed (S210: YES). Thereafter, in S220, the MFP 1 prompts the user to specify a second printing mode (see FIG. 15B). FIG. 15B is an illustrative view of a screen shown in the display unit 13 of the MFP 1 according to the embodiment of the invention. In S220, the MFP 1 displays the screen inquiring the user as to whether a QR code as a code symbol (a two-dimensional code in the present embodiment) linked to the second content should be printed. More specifically, a question "Print QR code?" along with options "YES" and "NO" is displayed in the display unit 13. In this stage, the user can select as to whether the QR code of the second content linked with the object is printed by operating the direction key of the operation unit 12 and specifying "YES" or "NO" with the focus 61. When the selection is made, the CPU proceeds to S225.

Figure 15C:
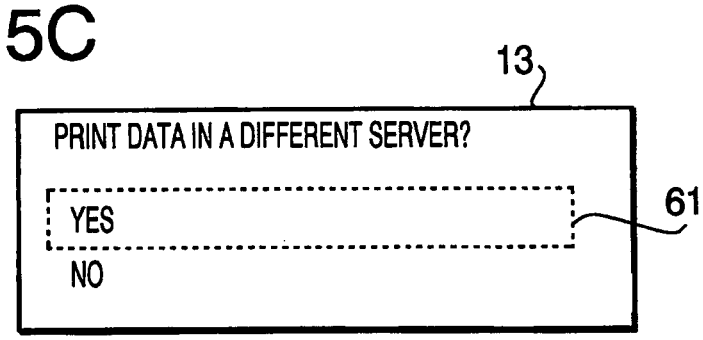

Next, in S225, the MFP 1 examines as to whether the code symbol linked with the object should be printed based on the selection made in S220. In S220, if the user has selected "YES", it is judged in S225 that the code symbol should be printed (S225: YES). Thereafter, in S230, the MFP 1 prompts the user to specify a third printing mode (see FIG. 15C). FIG. 15C is an illustrative view of a screen shown in the display unit 13 of the MFP 1 according to the embodiment of the invention. In S230, the MFP 1 displays the screen inquiring the user as to whether data in a separate server should be printed. More specifically, a question "Print data in a separate server?" along with options "YES" and "NO" is displayed in the display unit 13. In this stage, the user can select as to whether the code symbol that links the object as a link source and the second content as the linked content should be printed only when the object and the second content are stored in separate content delivery servers or the code symbol should be printed regardless of separation/coincidence of the content delivery servers wherein the object and the second content are stored by operating the direction key of the operation unit 12 and specifying "YES" or "NO" with the focus 61. When the selection is made, the CPU proceeds to S235.

Figure 15D:
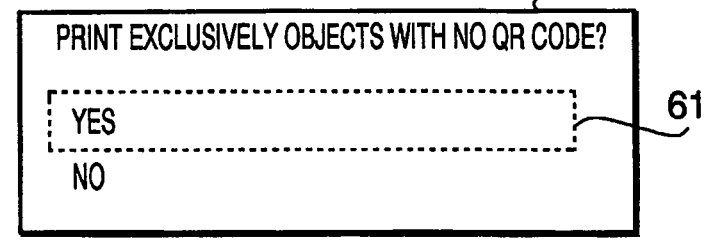

In S235, the MFP 1 examines as to whether the code symbol should be printed based on the selection made in S230. In S230, if the user has selected "NO", it is judged in S235 that the code symbol should not be printed (S235: NO). Thereafter, in S240, the MFP 1 prompts the user to specify a fourth printing mode (see FIG. 15D). FIG. 15D is an illustrative view of a screen shown in the display unit 13 of the MFP 1 according to the embodiment of the invention. In S240, the MFP 1 displays the screen inquiring the user as to whether an object with no QR code should be printed. More specifically, a question "Print exclusively an object with no QR code?" along with options "YES" and "NO" is displayed in the display unit 13. In this stage, the user can select as to whether an object included in the first content accompanying no code symbol should be exclusively appended a QR code being linked to the second content or all the objects included in the first content should be evenly appended QR codes. When the selection is made, the CPU proceeds to S245.

In S245, the MFP 1 examines as to whether the object in the first content accompanying no code symbol should be exclusively appended a code symbol printed based on the selection made in S240. In S240, if the user has selected "YES", an affirmative judgment is made in S245 that the object in the first content accompanying no code symbol should be exclusively appended a QR code (S245: YES). Next, in S250, the MFP 1 executes a print process A.

Figure 4:
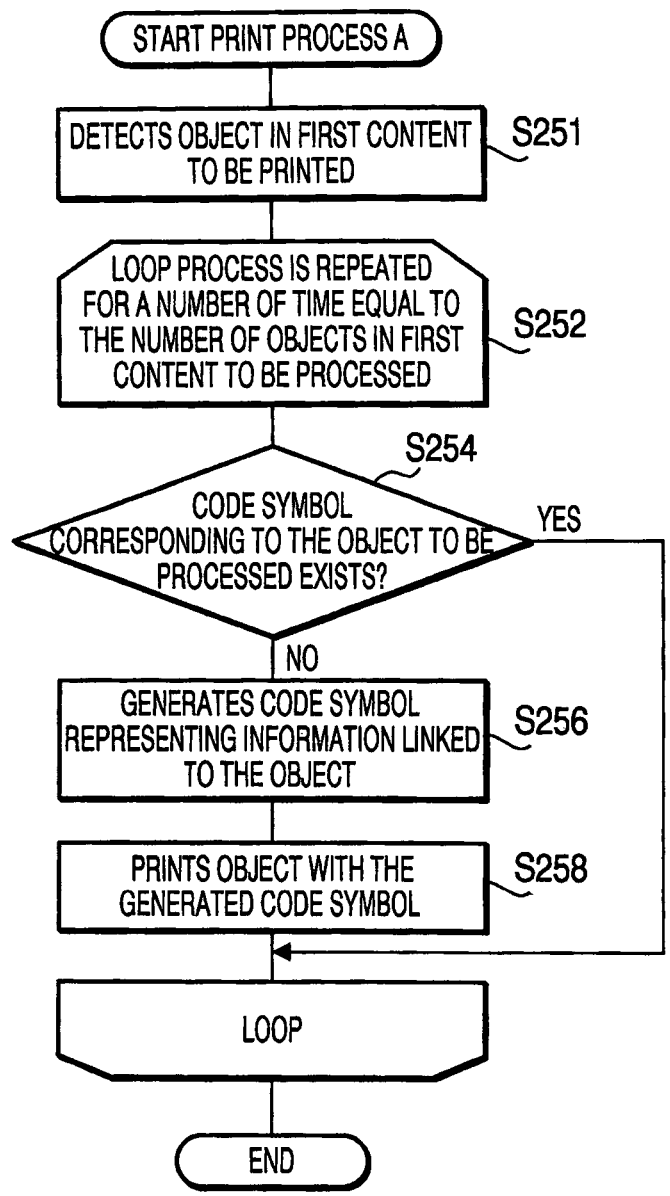
FIG. 4 is a flowchart to illustrate a print process A according to the embodiment of the invention.

FIG. 4 is a flowchart to illustrate the print process A according to the embodiment of the invention. As the print process A is started, in S251, the MFP 1 detects the object in the first content to be processed. The object to be processed is linked to the second content as the linked content. When the first content is described in HTML (Hyper Text Markup Language), an object linked to the second content can be detected by finding a predetermined tag and a predetermined parameter attached to the object.

Next, in S252, the MFP 1 executes a loop process. The loop process is repeated for a number of time which is equal to a number of the object (as detected in S251) in the first content to be processed.

In the loop process, in S254, the MFP 1 examines as to whether a code symbol accompanied with the object to be processed exists. In the present embodiment, when the object to be processed is an image, it is examined as to whether the image contains a feature of a code symbol (i.e., a two-dimensional QR code in the present embodiment). If the image contains the feature, it is judged that the code symbol corresponding to the object to be processed exists.

It should be noted that a method to determine the existence of the code symbol may not limited as above. For example, in addition to the object to be processed, an image arranged in adjacent to the object to be processed may be examined as to whether the image contains the feature of a code symbol.

Further, it may be determined that the code symbol exists when the image contains the feature of a code symbol, and a predetermined data string is contained in the code symbol, while it may be determined that the code symbol does not exist when the predetermined data string is not contained in the code symbol.

In S254, when it is judged that a code symbol corresponding to the object to be processed does not exist (S254: NO), in S256, the MFP 1 generates a code symbol representing information that is linked to the object. Information contained in the code symbol generated in S256, which will be referred to as "link information" in the present embodiment, includes a link URL (i.e., an address of the second content), a URL of a link source (i.e., an address of the first content), and an object URL (i.e., an address of the object). The code symbol generated in S256 is appended to the object, and in S258, the MFP 1 prints the object with the code symbol.

In S254, when it is judged that a code symbol corresponding to the object to be processed exists (S254: YES), the MFP 1 skips S256 and S258.

When the loop process as described above is repeated for a number of time that is equal to the number of the object in the first content to be processed, the print process A is terminated. Accordingly, the unified image printing process (see FIG. 3) is terminated.

In S240 in the unified image printing process, if the user has selected "NO", a negative judgment is made in S245 that the object in the first content should be evenly appended a QR code regardless of an existing QR code (S245: NO). Next, in S270, the MFP 1 executes a print process B.

Figure 5:
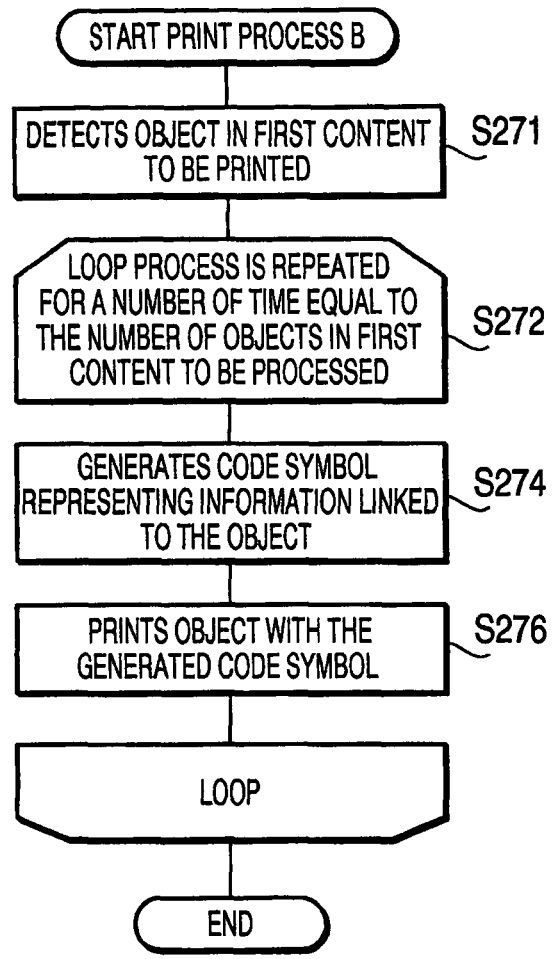
FIG. 5 is a flowchart to illustrate a print process B according to the embodiment of the invention.

FIG. 5 is a flowchart to illustrate the print process B according to the embodiment of the invention. As the print process B is started, in S271, the MFP 1 detects the object in the first content to be processed. Next, in S272, the MFP 1 executes a loop process. The loop process is repeated for a number of time which is equal to a number of the object (as detected in S271) in the first content to be processed.

In S274, the MFP 1 generates a code symbol representing information that is linked to the object and appends to the object. In S276, the MFP 1 prints the object with the appended code symbol. It should be noted that in the print process A, the code symbol is generated, appended, and printed exclusively when no code symbol corresponding to the object to be processed exists. However, in the print process B, a code symbol is generated appended, and printed regardless of an existing code symbol. The code symbol generated in S247 is equivalent to the code symbol generated in S256.

When the loop process as described above is repeated for a number of time that is equal to the number of the object in the first content to be processed, the print process B is terminated. Accordingly, the unified image printing process (see FIG. 3) is terminated.

Figure 6:
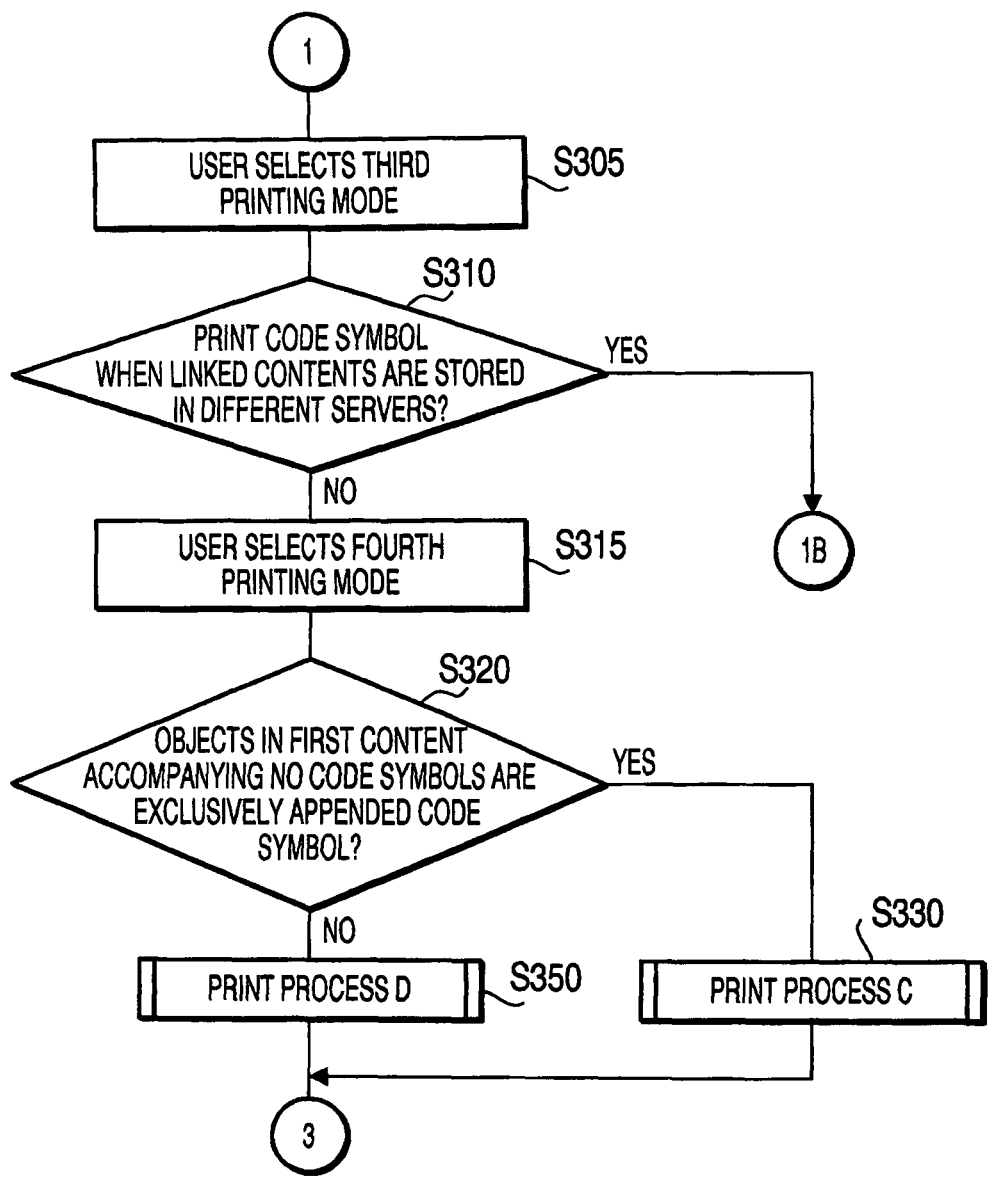
FIG. 6 is a flowchart to illustrate a second part of the unified image printing process according to the embodiment of the invention.

In S220 in FIG. 3, if the user has selected "NO", it is judged in S225 that the code symbol should not be printed (S225: NO). The MFP 1 proceeds to S305 shown in FIG. 6. FIG. 6 is a flowchart to illustrate a second part of the unified image printing process according to the embodiment of the invention. In S305, the MFP 1 prompts the user to specify a third printing mode (see FIG. 15C). The MFP 1 displays the screen inquiring the user as to whether data in a separate server should be printed. More specifically, a question "Print data in a separate server?" along with options "YES" and "NO" is displayed in the display unit 13. In this stage, the user can select as to whether the code symbol that links the object as the link source and the second content as the linked content should be printed only when the object and the second content are stored in separate content delivery servers or the code symbol should be printed regardless of separation/coincidence of the content delivery servers wherein the object and the second content are stored by operating the direction key of the operation unit 12 and specifying "YES" or "NO" with the focus 61. When the selection is made, the CPU proceeds to S310.

In S310, the MFP 1 examines as to whether the code symbol should be printed based on the selection made in S305. In S305, if the user has selected "NO", it is judged in S310 that the code symbol should not be printed (S310: NO). Thereafter, in S315, the MFP 1 prompts the user to specify a fourth printing mode (see FIG. 15D). In S315, the MFP 1 displays the screen inquiring the user as to whether an object with no QR code should be printed. More specifically, a question "Print exclusively an object with no QR code?" along with options "YES" and "NO" is displayed in the display unit 13. In this stage, the user can select as to whether an object included in the first content accompanying no code symbol should be exclusively appended a QR code being linked to the second content or all the objects included in the first content should be evenly appended QR codes by operating the direction key of the operation unit 12 and specifying "YES" or "NO" with the focus 61. When the selection is made, the CPU proceeds to S320.

In S320, the MFP 1 examines as to whether the object in the first content accompanying no code symbol should be exclusively appended a code symbol printed based on the selection made in S315. In S315, if the user has selected "YES", an affirmative judgment is made in S320 that the object in the first content accompanying no code symbol should be exclusively appended a QR code (S320: YES). Next, in S330, the MFP 1 executes a print process C.

Figure 7:
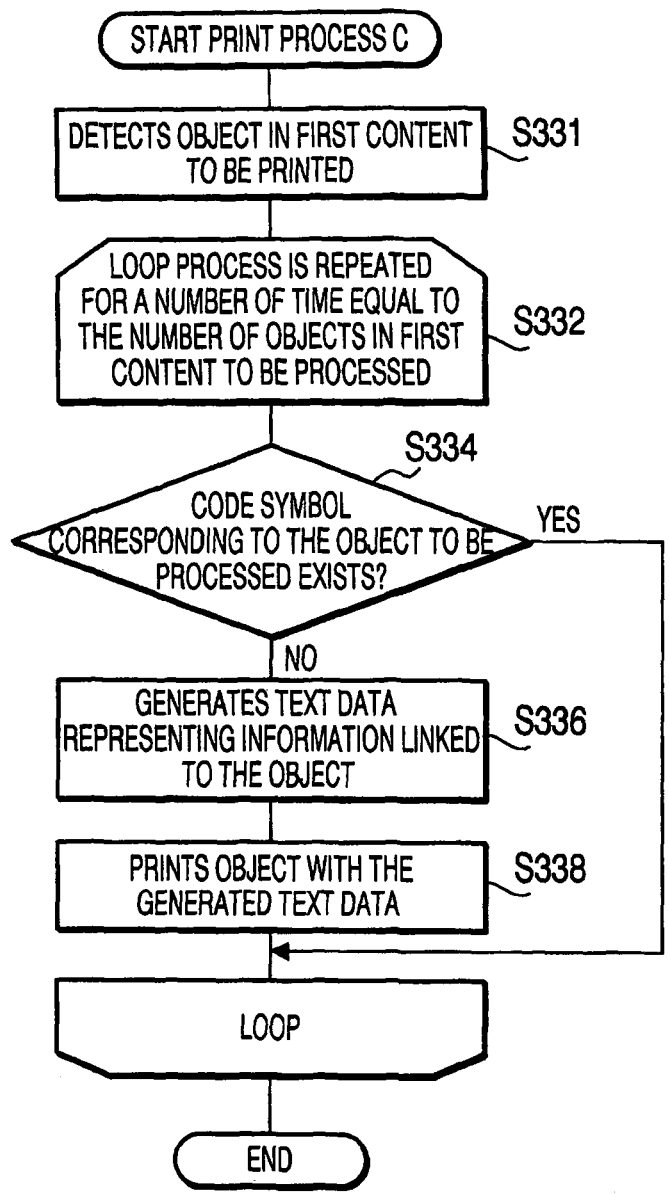
FIG. 7 is a flowchart to illustrate a print process C according to the embodiment of the invention.

FIG. 7 is a flowchart to illustrate the print process C according to the embodiment of the invention. As the print process C is started, in S331, the MFP 1 detects the object in the first content to be processed. Next, in S332, the MFP 1 executes a loop process. The loop process is repeated for a number of time which is equal to a number of the object (as detected in S331) in the first content to be processed.

In the loop process, in S334, the MFP 1 examines as to whether a code symbol accompanied with the object to be processed exists. A method to determine the existence of the code symbol is identical to the method used in S254.

In S334, when it is judged that a code symbol corresponding to the object to be processed does not exist (S334: NO), in S336, the MFP 1 generates text data representing information that is linked to the object. The text data generated in S336 includes a link URL (i.e., an address of the second content) and a URL of a link source (i.e., an address of the first content). The text data generated in S336 is appended to the object, and in S338, the MFP 1 prints the object with the text. In S334, when it is judged that a code symbol corresponding to the object to be processed exists (S334: YES), the MFP 1 skips S336 and S338.

When the loop process as described above is repeated for a number of time that is equal to the number of the object in the first content to be processed, the print process C is terminated. Accordingly, the unified image printing process (see FIG. 3) is terminated.

In S315 in the unified image printing process, if the user has selected "NO", a negative judgment is made in S320, further, in S350, the MFP 1 executes a print process D.

Figure 8:
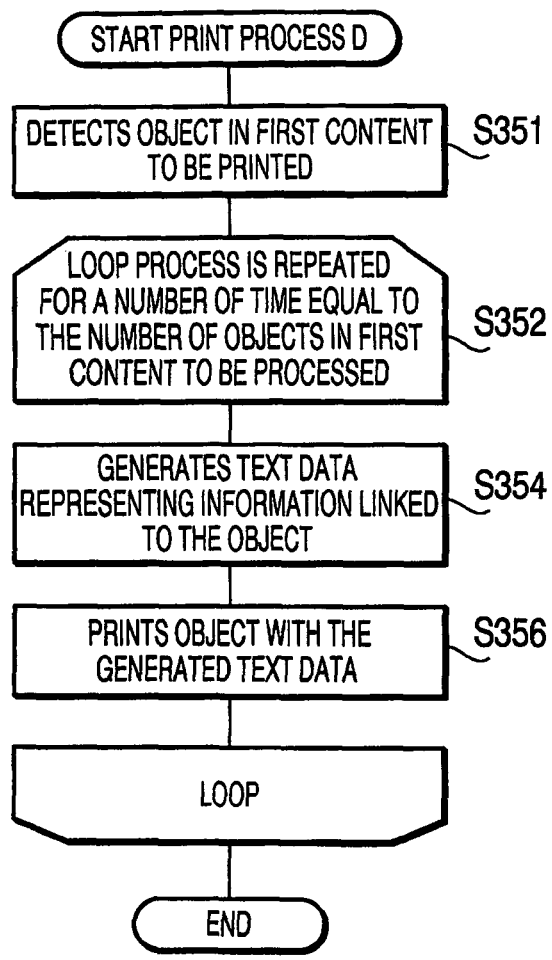
FIG. 8 is a flowchart to illustrate a print process D according to the embodiment of the invention.

FIG. 8 is a flowchart to illustrate the print process D according to the embodiment of the invention. As the print process D is started, in S351, the MFP 1 detects the object in the first content to be processed. Next, in S352, the MFP 1 executes a loop process. The loop process is repeated for a number of time which is equal to a number of the object (as detected in S351) in the first content to be processed.

In S354, the MFP 1 generates text data representing information that is linked to the object and appends to the object. In S356, the MFP 1 prints the object with the appended text. It should be noted that in the print process C, the text data is generated, appended, and printed exclusively when no code symbol corresponding to the object to be processed exists. However, in the print process D, text data is generated appended, and printed regardless of an existing code symbol. The text data generated in S354 is equivalent to the code symbol generated in S336.

When the loop process as described above is repeated for a number of time that is equal to the number of the object in the first content to be processed, the print process D is terminated. Accordingly, the unified image printing process (see FIG. 3) is terminated.

In S305, if the user has selected "YES", an affirmative judgment is made in S310 (S310: YES). Next, in S405, the MFP 1 prompts the user to specify a fourth printing mode (see FIG. 9).

Figure 9:
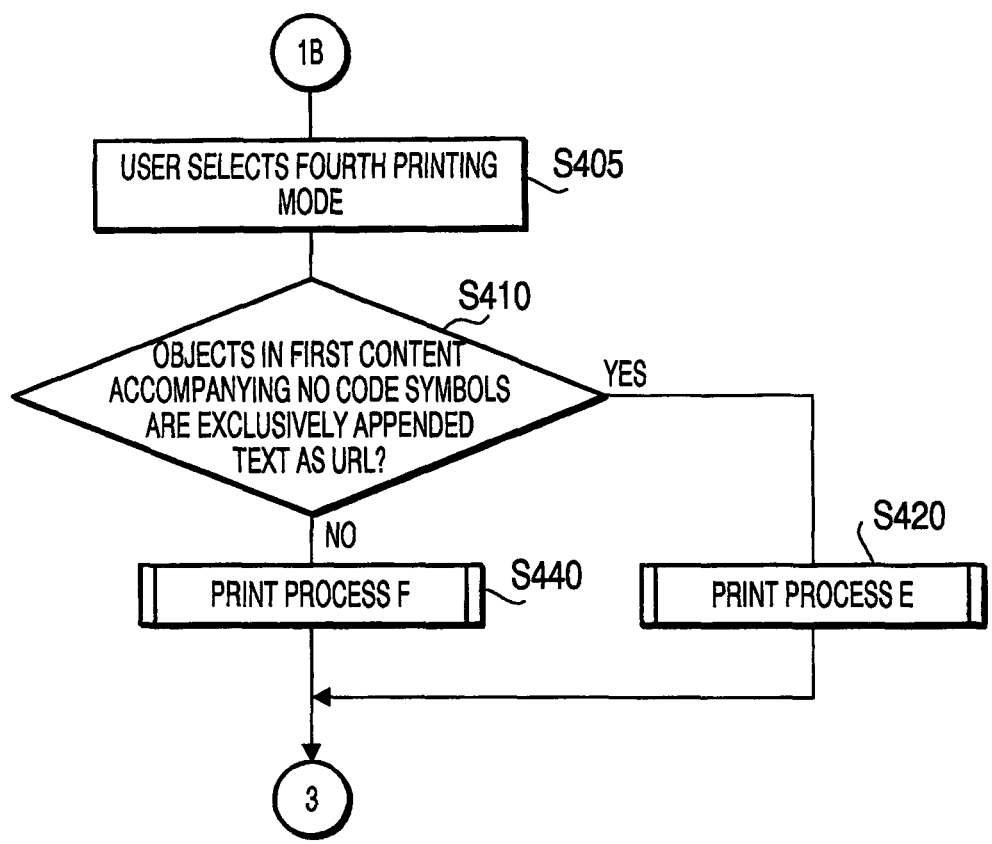
FIG. 9 is a flowchart to illustrate a third part of the unified image printing process according to the embodiment of the invention.

FIG. 9 is a flowchart to illustrate a third part of the unified image printing process according to the embodiment of the invention. In S405, the MFP 1 displays the screen as shown in FIG. 15D inquiring the user as to whether an object with no QR code should be printed. More specifically, a question "Print exclusively an object with no QR code?" along with options "YES" and "NO" is displayed in the display unit 13. In this stage, the user can select as to whether an object included in the first content accompanying no code symbol should be exclusively appended a QR code being linked to the second content or all the objects included in the first content should be evenly appended QR codes by operating the direction key of the operation unit 12 and specifying "YES" or "NO" with the focus 61. When the selection is made, the CPU proceeds to S410.

In S410, the MFP 1 examines as to whether the object in the first content accompanying no code symbol should be exclusively appended a code symbol printed based on the selection made in S405. In S405, if the user has selected "YES", an affirmative judgment is made in S410 that the object in the first content accompanying no code symbol should be exclusively appended a QR code (S410: YES). Next, in S420, the MFP 1 executes a print process E.

Figure 10:
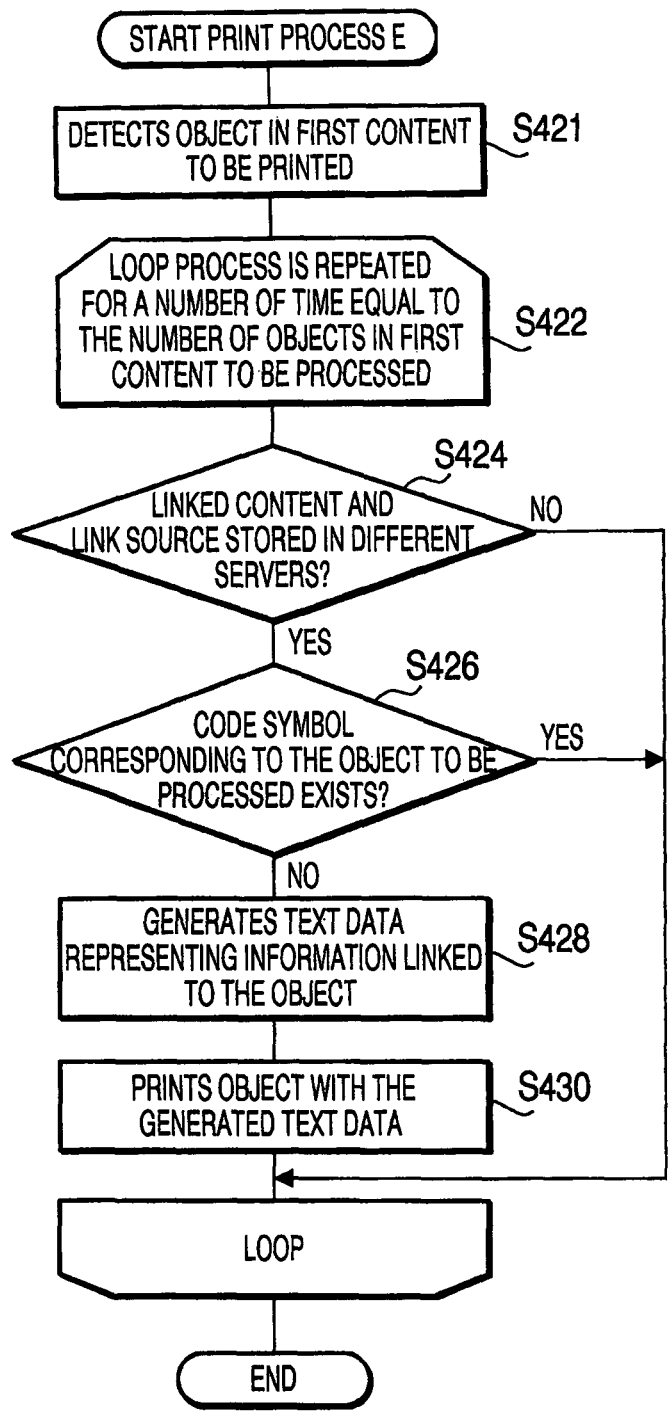
FIG. 10 is a flowchart to illustrate a print process E according to the embodiment of the invention.

FIG. 10 is a flowchart to illustrate the print process E according to the embodiment of the invention. As the print process E is started, in S421, the MFP 1 detects the object in the first content to be processed. Next, in S422, the MFP 1 executes a loop process. The loop process is repeated for a number of time which is equal to a number of the object (as detected in S421) in the first content to be processed.

In the loop process, in S424, the MFP 1 examines as to whether an address (linked address) of a content delivery server storing the second content (linked content) that is linked with the object and an address of the content delivery server storing the object as the link source are different. In the present embodiment, in S424, parts of a URL corresponding to the linked address and a URL corresponding to the address of the link source corresponding to domain names assigned to the content delivery servers are extracted. Further, IP addresses corresponding to the domain names are obtained from a DNS (Domain Name Server). When the IP addresses do not coincide with each other, it is judged that the content delivery server wherein the object is stored and the content delivery server wherein the linked content is stored are different servers.

In S424, when it is judged that the linked content and the link source are stored in separate content delivery servers (S424: YES), in S426, the MFP 1 examines as to whether a code symbol accompanied with the object to be processed exists. A method to determine the existence of the code symbol is identical to the method used in S254 and S334.

In S426, when it is judged that a code symbol corresponding to the object to be processed does not exist (S426: NO), in S428, the MFP 1 generates text data representing information that is linked to the object. The text data generated in S428, including a link URL (i.e., the address of the linked content) and a URL of the link source (i.e., the address of the object), is equivalent to the text data generated in S336. The text data generated in S428 is appended to the object, and in S430, the MFP 1 prints the object with the text. In S424, when it is judged that the linked content and the link source are stored in a same content delivery server (S424: NO), and in S426, when it is judged that a code symbol corresponding to the object to be processed exists (S426: YES), the MFP 1 skips S428 and S430.

When the loop process as described above is repeated for a number of time that is equal to the number of the object in the first content to be processed, the print process E is terminated. Accordingly, the unified image printing process (see FIG. 3) is terminated.

In S405 in the unified image printing process, if the user has selected "NO", a negative judgment is made in S410, further, in S440, the MFP 1 executes a print process F.

Figure 11:
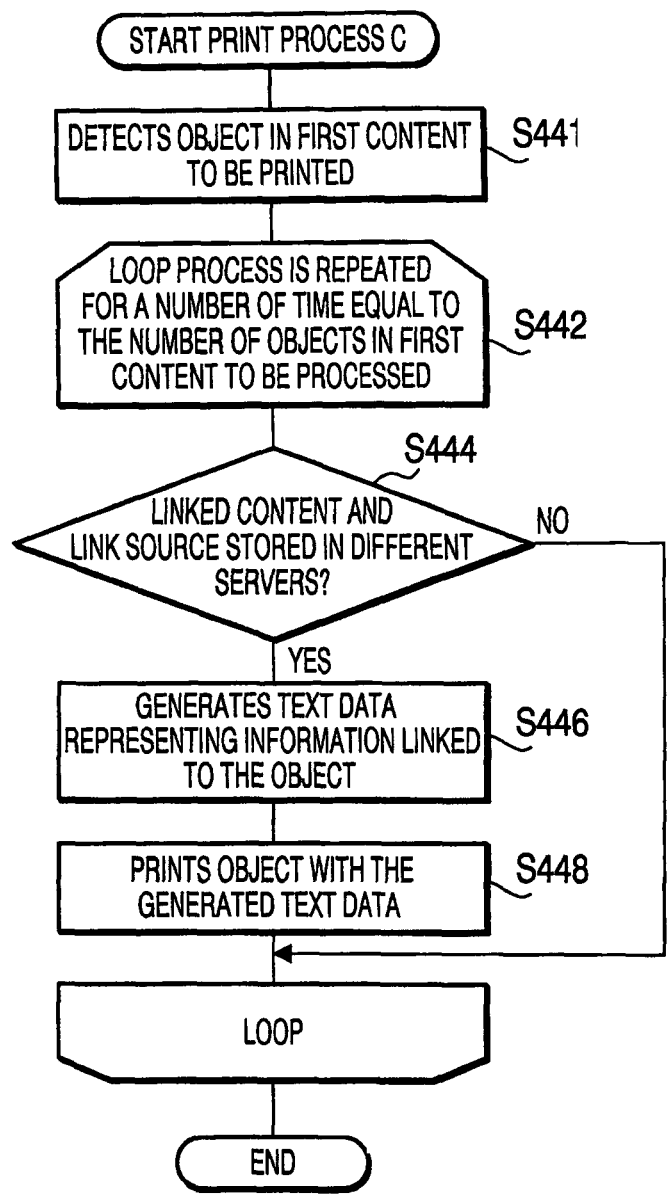
FIG. 11 is a flowchart to illustrate a print process F according to the embodiment of the invention.

FIG. 11 is a flowchart to illustrate the print process F according to the embodiment of the invention. As the print process F is started, in S441, the MFP 1 detects the object in the first content to be processed. Next, in S442, the MFP 1 executes a loop process. The loop process is repeated for a number of time which is equal to a number of the object (as detected in S441) in the first content to be processed.

In the loop process, in S444, the MFP 1 examines as to whether an address (linked address) of a content delivery server storing the second content (linked content) that is linked with the object and an address of the content delivery server storing the object as the link source are different. A method to determine the difference/coincidence of the content delivery servers is identical to the method used in S424.

In S444, when it is judged that the linked content and the link source are stored in separate content delivery servers (S444: YES), the MFP 1 generates text data representing information that is linked to the object. The text data generated in S446, including a link URL (i.e., the address of the linked content) and a URL of the link source (i.e., the address of the object), is equivalent to the text data generated in S336 and S428. The text data generated in S446 is appended to the object, and in S448, the MFP 1 prints the object with the text. In S444, when it is judged that the linked content and the link source are stored in a same content delivery server (S444: NO), the MFP 1 skips S446 and S448.

When the loop process as described above is repeated for a number of time that is equal to the number of the object in the first content to be processed, the print process F is terminated. Accordingly, the unified image printing process (see FIG. 3) is terminated.

In S230, if the user has selected "YES", an affirmative judgment is made in S235 (S235: YES). Next, in S505, the MFP 1 prompts the user to specify a fourth printing mode (see FIG. 12).

Figure 12:
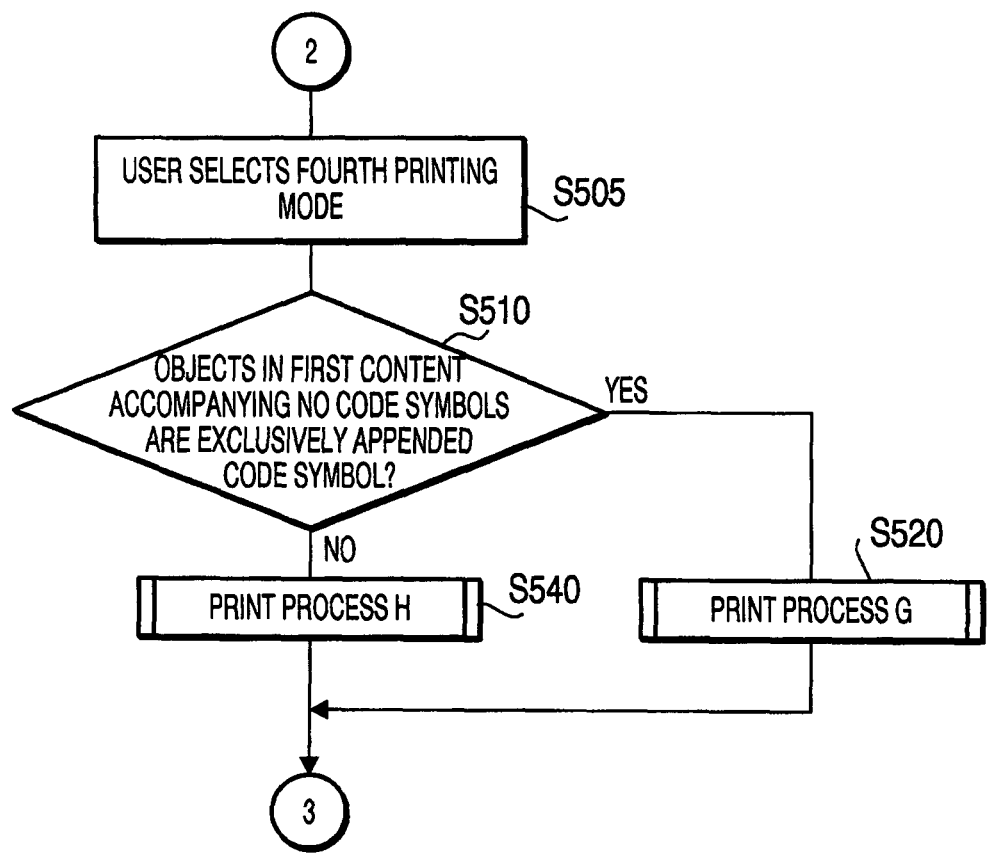
FIG. 12 is a flowchart to illustrate a fourth part of the unified image printing process according to the embodiment of the invention.

FIG. 12 is a flowchart to illustrate a fourth part of the unified image printing process according to the embodiment of the invention. In S505, the MFP 1 displays the screen as shown in FIG. 15D inquiring the user as to whether an object with no QR code should be printed. More specifically, a question "Print exclusively an object with no QR code?" along with options "YES" and "NO" is displayed in the display unit 13. In this stage, the user can select as to whether an object included in the first content accompanying no code symbol should be exclusively appended a QR code being linked to the second content or all the objects included in the first content should be evenly appended QR codes by operating the direction key of the operation unit 12 and specifying "YES" or "NO" with the focus 61. When the selection is made, the CPU proceeds to S510.

In S510, the MFP 1 examines as to whether the object in the first content accompanying no code symbol should be exclusively appended a code symbol printed based on the selection made in S505. In S505, if the user has selected "YES", an affirmative judgment is made in S510 that the object in the first content accompanying no code symbol should be exclusively appended a QR code (S510: YES). Next, in S520, the MFP 1 executes a print process G.

Figure 13:
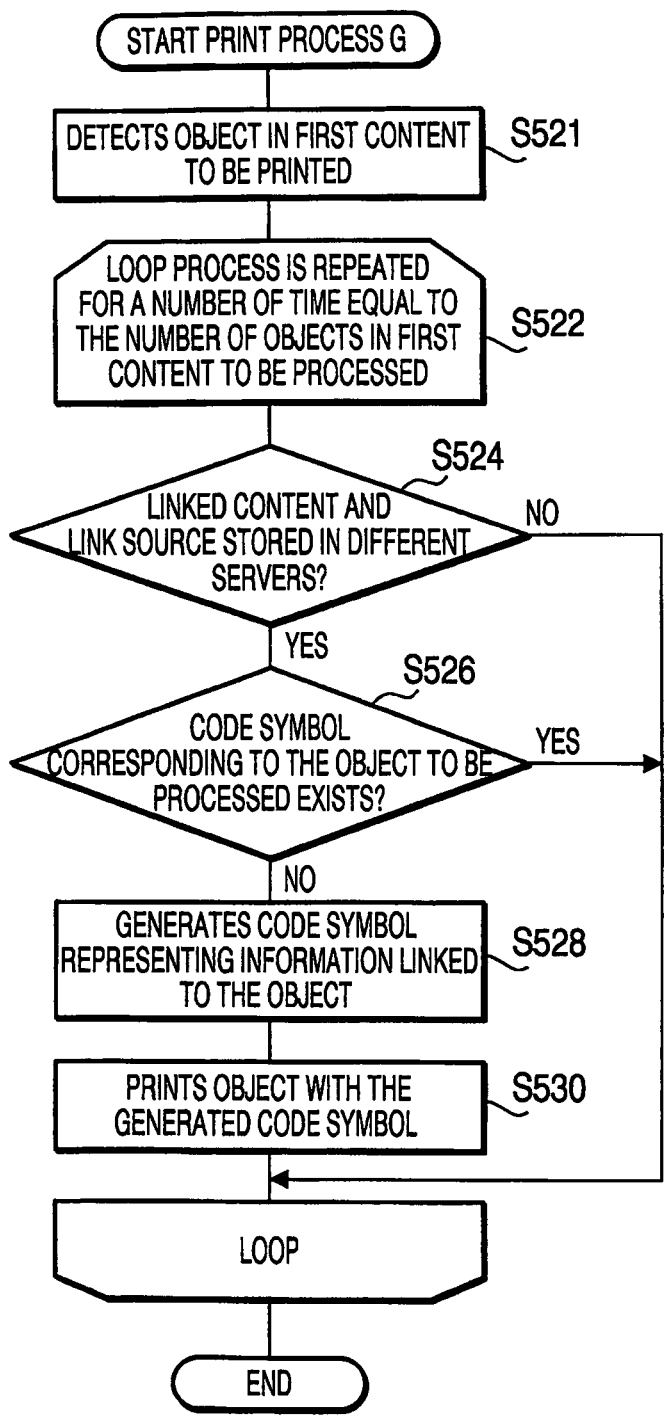
FIG. 13 is a flowchart to illustrate a print process G according to the embodiment of the invention.

FIG. 13 is a flowchart to illustrate the print process G according to the embodiment of the invention. As the print process G is started, in S521, the MFP 1 detects the object in the first content to be processed. Next, in S522, the MFP 1 executes a loop process. The loop process is repeated for a number of time which is equal to a number of the object (as detected in S521) in the first content to be processed.

In the loop process, in S524, the MFP 1 examines as to whether an address (linked address) of a content delivery server storing the second content (linked content) that is linked with the object and an address of the content delivery server storing the object as the link source are different. A method to determine the difference/coincidence of the content delivery servers is identical to the method used in S424 and S444.

In S524, when it is judged that the linked content and the link source are stored in separate content delivery servers (S524: YES), in S526, the MFP 1 examines as to whether a code symbol accompanied with the object to be processed exists. A method to determine the existence of the code symbol is identical to the method used in S254, S334, and S426.

In S526, when it is judged that a code symbol corresponding to the object to be processed does not exist (S526: NO), in S528, the MFP 1 generates a code symbol representing information that is linked to the object. The code symbol generated in S528 is equivalent to the code symbol generated in S256 and S274. The code symbol generated in S528 is appended to the object, and in S530, the MFP 1 prints the object with the code symbol In S524, when it is judged that the linked content and the link source are stored in a same content delivery server (S524: NO), and in S526, when it is judged that a code symbol corresponding to the object to be processed exists (S526: YES), the MFP 1 skips S528 and S530.

When the loop process as described above is repeated for a number of time that is equal to the number of the object in the first content to be processed, the print process G is terminated. Accordingly, the unified image printing process (see FIG. 3) is terminated.

In S505 in the unified image printing process, if the user has selected "NO", a negative judgment is made in S510, further, in S540, the MFP 1 executes a print process H.

Figure 14:
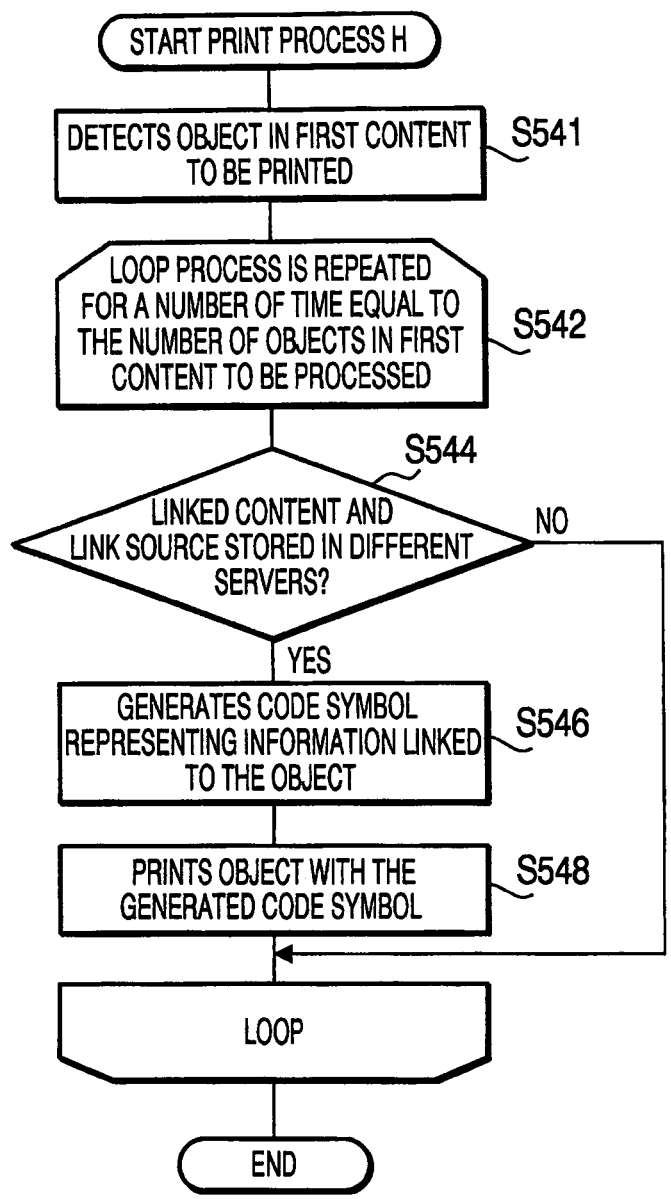
FIG. 14 is a flowchart to illustrate a print process H according to the embodiment of the invention.

FIG. 14 is a flowchart to illustrate the print process H according to the embodiment of the invention. As the print process H is started, in S541, the MFP 1 detects the object in the first content to be processed. Next, in S542, the MFP 1 executes a loop process. The loop process is repeated for a number of time which is equal to a number of the object (as detected in S541) in the first content to be processed.

In the loop process, in S544, the MFP 1 examines as to whether an address (linked address) of a content delivery server storing the second content (linked content) that is linked with the object and an address of the content delivery server storing the object as the link source are different. A method to determine the difference/coincidence of the content delivery servers is identical to the method used in S424, S444, and S524.

In S544, when it is judged that the linked content and the link source are stored in separate content delivery servers (S544: YES), in S546, the MFP 1 generates a code symbol representing information that is linked to the object. The code symbol generated in S546 is equivalent to the code symbol generated in S256, S274, and S528. The code symbol generated in S546 is appended to the object, and in S548, the MFP 1 prints the object with the code symbol. In S544, when it is judged that the linked content and the link source are stored in a same content delivery server (S544: NO), the MFP 1 skips S546 and S548.

When the loop process as described above is repeated for a number of time that is equal to the number of the object in the first content to be processed, the print process H is terminated. Accordingly, the unified image printing process (see FIG. 3) is terminated.

Figure 16A:
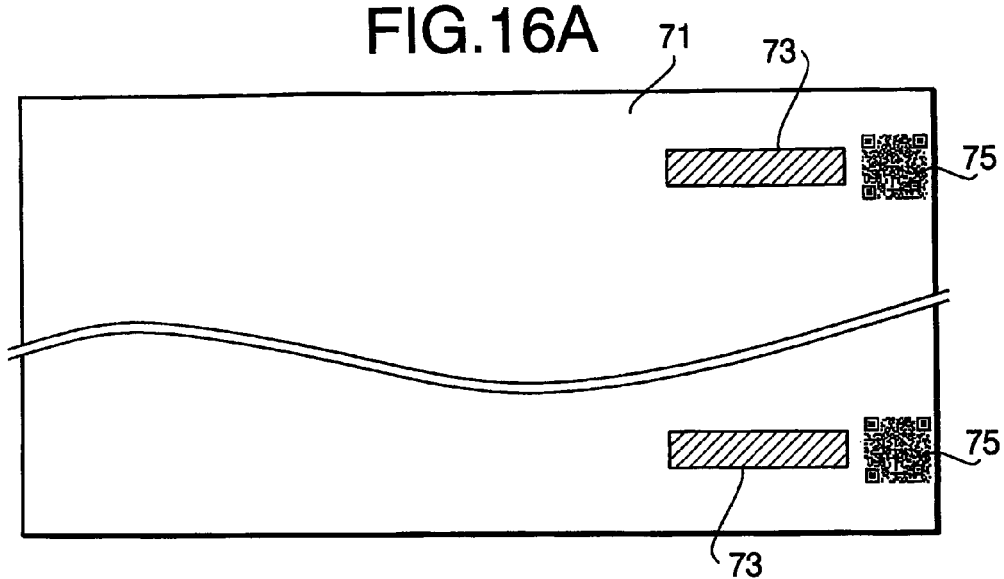
FIGS. 16A and 16B are illustrative views of printed outputs according to the embodiment of the invention.

As the MFP 1 executes the unified image printing process as described above, and when the user makes a selection to have the information representing the linked content in the code symbol, a printed output with a printed pattern 17 being printed thereon for example as shown in FIG. 16A is provided from the printing unit 17 of the MFP 1.

Figure 16B:
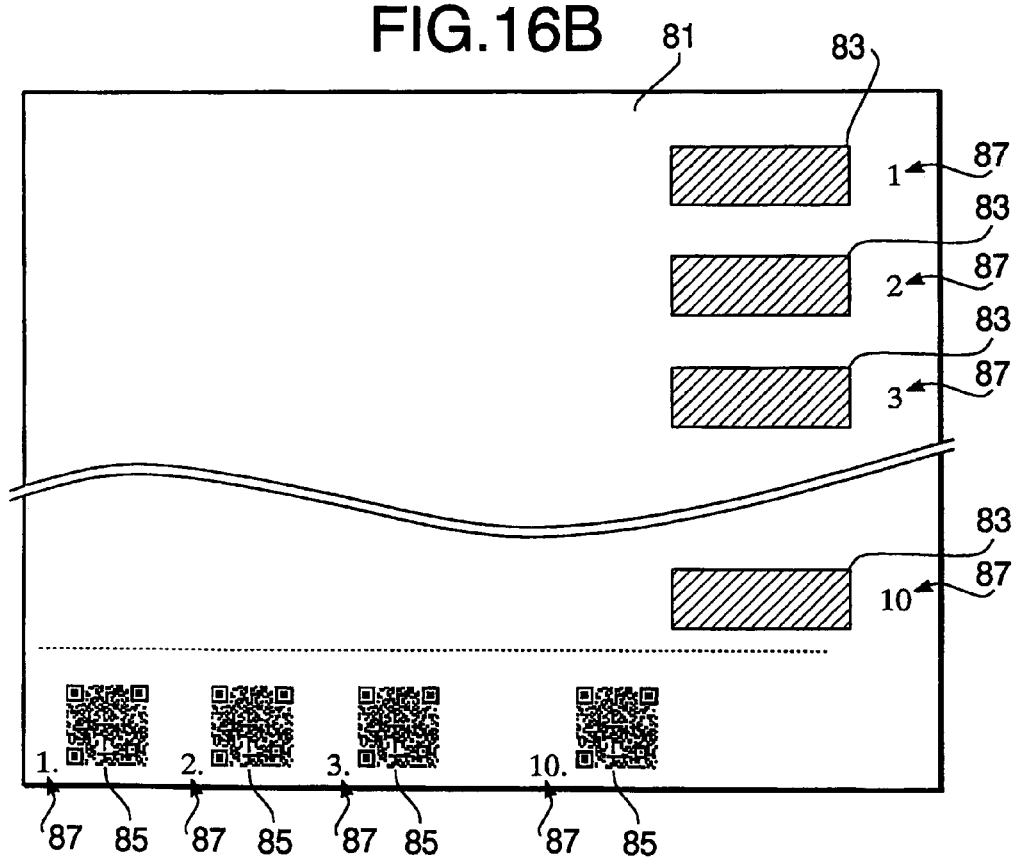

FIGS. 16A and 16B are illustrative views of printed outputs according to the embodiment of the invention. The printed pattern 71 includes the first content having an object 73 and a code symbol 75 (i.e., the QR code in the present embodiment) corresponding to the object 73. In the printed pattern 71, the code symbol 75 is provided in a position wherein the code symbol 75 accompanies the object 73.

It should be noted that the object 73 which is linked with an address of the linked content (second content) may not necessarily a text, but may be an image. The first content may include a text and an image that are not linked with the address of the second content. In such a case, the object without the linked address is not appended a code symbol. It should be noted that in FIG. 16A the object 73 as an object to be appended the code symbol 75 is shown, although an object not to be appended a code symbol is omitted.

The code symbol 75 is generated in one of S256, S274, S528, and S546. The code symbol 75 is scanned in a unified information input process via scanner, which will be described in detail hereinafter, so that the link information (i.e., the link URL, which is the address of the second content, the URL of the link source, which is the address of the first content, and the URL of the object, which is the address of the object 73) that links the object with the second content is obtained.

In the printed pattern 71 shown in FIG. 16A, the code symbol 75 is provided in the position wherein the code symbol 75 accompanies the object 73, although the position of the code symbol is not limited to this. More specifically, for example, as shown in a printed pattern 81 in FIG. 16B, a code symbol 85 corresponding to an object 83 may be printed in an area which is apart from an area wherein the first content having the object 83. In the printed pattern 81 shown in FIG. 16B, a plurality of code symbols 85 are aligned in an area lower than the area wherein the first content is provided.

When the code symbol 75 is accompanied with the object 73 as shown in FIG. 16A, it is advantageous in that the correspondence between the object 73 and the code symbol 75. When the code symbols 85 are printed in the area apart from the area wherein the first content is printed, as shown in FIG. 16B, on the other hand, the plurality of code symbols 85 can be recognized in a glance so that the user should not fail to find the code symbols 85. Thus, the area wherein the code symbols 75, 85 should be determined based on convenience of the user. Alternatively, it should be configured such that the area wherein the code symbols 75, 85 are provided can be arbitrarily selected by the user.

In order to clarify the correspondence between the code symbol and the object more specifically, reference numerals 87 indicating the correspondence may be provided as shown in FIG. 16B. Thus, the user can easily recognize the correspondence between the objects 83 and the code symbols 85 having identical reference numerals by viewing the reference numerals 87.

In the unified image printing process as described above 1, when the user makes a selection that the link information representing the address of the linked content is indicated in a text and not indicated in a code symbol, the link URL and the URL of the link source are printed in texts. In a unified information input process via panel, which will be described in detail hereinafter, the link URL and the URL of the link source printed in texts can be inputted through the operation unit 12 of the MFP 1.

Figure 17:
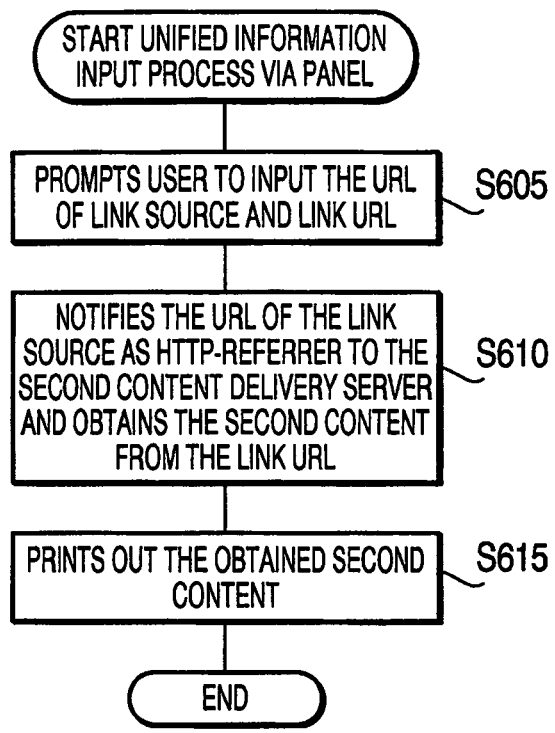
FIG. 17 is a flowchart to illustrate a unified information input process via panel according to the embodiment of the invention.

Hereinafter, referring to FIG. 17, the unified information input process via panel (see also S120 in FIG. 2) will be described in detail. FIG. 17 is a flowchart to illustrate the unified information input process via panel according to the embodiment of the invention.

The unified information input process via panel is a process executed by the MFP 1 so that the MFP 1 can access the second delivery server 3 based on the link information printed in a text in the unified image printing process (in S338, S356, S430, S448).

As the unified information input process via panel is started, in S605, the MFP 1 prompts the user to input the URL of the link source and the link URL. In this step, the user inputs the URL of the link source and the link URL referring to the link information printed in texts in the unified image printing process. As the user completes inputting, the MFP 1 proceeds to S610.

In S610, the MFP 1 notifies the second content delivery server 3 of the URL of the link source as an HTTP-referrer and obtains the second content from the second content server represented by the link URL. In this step, as the URL of the link source indicates the address of the first content delivery server wherein the first content having the object with the link URL is stored, a request from the MFP 1, which is equivalent to a request being sent to the second content delivery server 3 when an object in the first content is specified (clicked) as the first content is viewed in a web browser, is sent to the second content delivery server 3. The second content delivery server 3 receiving the request recognizes the request was sent as a request for viewing the second content (as a consequence of the object being clicked) by the user who is viewing the first content. Accordingly, the second content delivery server 3 sends the second content to the MFP 1.

As the MFP 1 obtains the second content, in S615, the MFP 1 prints out the second content. The MFP 1 terminates the unified information input process via panel.

Figure 18:
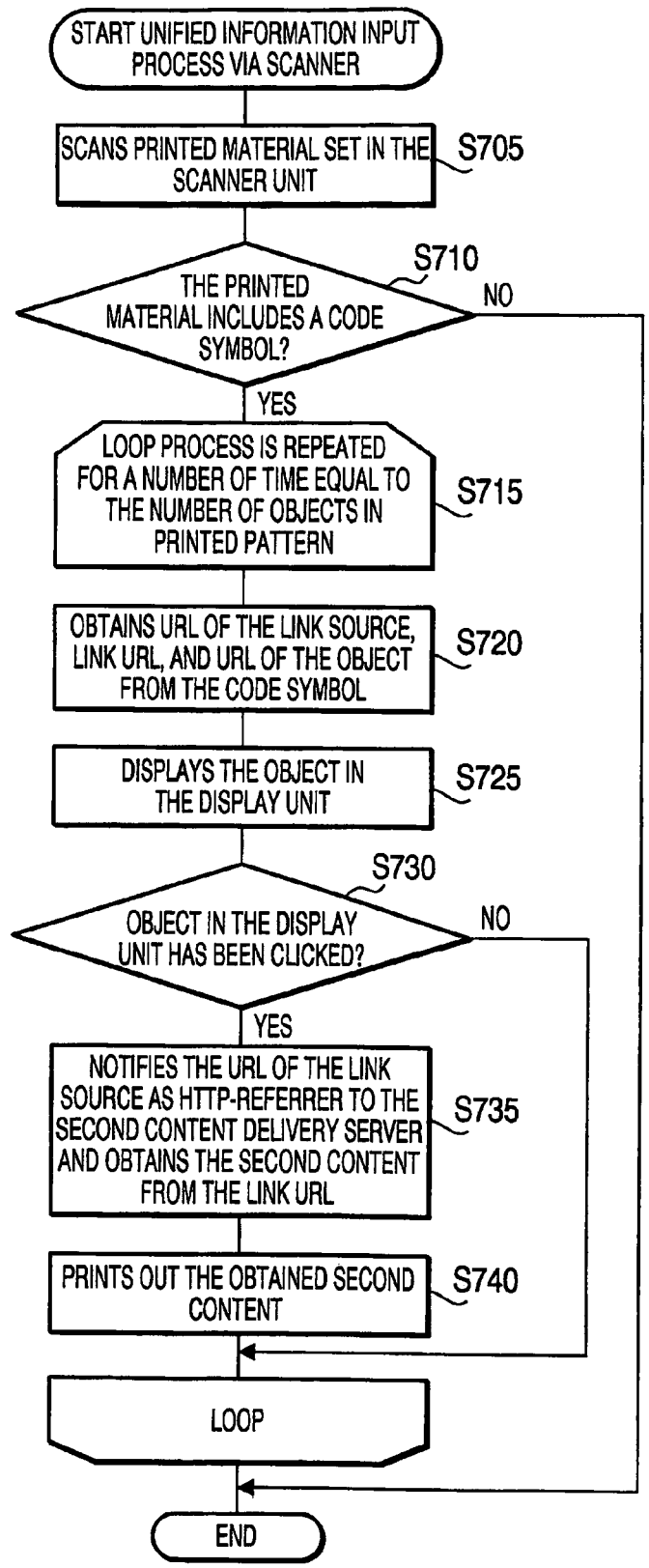
FIG. 18 is a flowchart to illustrate a unified information input process via scanner according to the embodiment of the invention.

Hereinafter, referring to FIG. 18, the unified information input process via scanner (see also S130 in FIG. 2) will be described in detail. FIG. 18 is a flowchart to illustrate the unified information input process via scanner according to the embodiment of the invention.

The unified information input process via scanner is a process executed by the MFP 1 so that the MFP 1 can access the second delivery server 3 based on the link information printed in a code symbol in the unified image printing process (in S258, S276, S530, S548).

As the unified information input process via scanner is started, in S705, the MFP 1 scans a printed material (not shown) set in the scanner unit 16 of the MFP 1, and in S710, it is examined as to whether the printed material includes a printed pattern with a code symbol to be processed. In the present embodiment, it is examined as to whether an image obtained by scanning the printed material contains a feature of a code symbol (i.e., the QR code). If the image contains the feature, it is judged that the printed material includes a printed pattern with the code symbol to be processed.

In S710, when it is judged that the printed material includes a printed pattern with the code symbol to be processed (S710: YES), the MFP 1 executes a loop process. The loop process is repeated for a number of time which is equal to a number of the code symbol (as scanned in S710) in the printed pattern in the printed material.

In the loop process, in S720, the MFP 1 obtains a URL of the link source, a link URL, and a URL of the object from the code symbol. Next, in S725, the object is displayed in the display unit 13 of the MFP 1. The object displayed in S725, which is obtained from the second content delivery server 3 based on the URL of the object obtained in S720, is equivalent to the object included as a banner advertisement in the first content.

When the object is displayed, in S730, the MFP 1 examines as to whether the object displayed in the display unit 13 has been specified (clicked) by an operation from the user through the operation unit 12. When it is judged that the object has been clicked (S730: YES), in S735, the MFP 1 notifies the second content delivery server 3 of the URL of the link source as an HTTP-referrer and obtains the second content from the second content server represented by the link URL. In this step, as the URL of the link source indicates the address of the first content delivery server wherein the first content having the object with the link URL is stored, a request from the MFP 1, which is equivalent to a request being sent to the second content delivery server 3 when an object in the first content is specified (clicked) as the first content is viewed in a web browser, is sent to the second content delivery server 3. The second content delivery server 3 receiving the request recognizes the request was sent as a request for viewing the second content (as a consequence of the object being clicked) by the user who is viewing the first content. Accordingly, the second content delivery server 3 sends the second content to the MFP 1.

As the MFP 1 obtains the second content, in S740, the MFP 1 prints out the second content. The MFP 1 terminates the unified information input process via scanner.

In S730, when it is judged that the object has not been clicked (S730: NO), the MFP 1 skips S735 and S740.

When the loop process as described above is repeated for a number of time that is equal to the number of the code symbol included in the printed pattern in the printed material, the loop process is terminated. Accordingly, the unified information input process via scanner is terminated.

In S710, when it is judged that the printed material includes a printed pattern with the code symbol to be processed (S710: NO), the MFP 1 skips S715 through S740 and terminates the unified information input process via scanner.

With the MFP 1 as described above, as the first content is printed out, the code symbols 75, 85 representing the addresses of the linked content of the objects contained in the first content are appended. Accordingly, the second content as the linked content with the address indicated by the code symbols 75, 85 can be easily accessed by scanning the code symbols 75, 85 with the scanner unit 16.

Further, with the MFP 1 as described above, the code symbols 75, 85 can be generated when the content delivery server wherein the link source is stored and the content delivery server wherein the linked content is stored are different so that an excessive number of the code symbols 75, 85 should not be appended when the content delivery server wherein the link source is stored and the content delivery server wherein the linked content is stored are the same.

Further, with the MFP 1 as described above, the code symbols 75, 85 can be generated when no existing code symbol is included in the first content so that redundant code symbols 75, 85 should not be appended when an existing code symbol is included in the first content.

Further, with the MFP 1 as described above, the code symbol 75 is appended and printed in the area wherein the code symbol 75 accompanies the object 73 so that the correspondence between the code symbol 75 and the object 73 can be easily recognized on the printed output.

Alternatively, with the MFP 1 as described above, the code symbols 85 can be appended and printed in the area apart from the area wherein the first content is printed so that the plurality of code symbols can be recognized in a glance and the user should not fail to find the code symbols 85.

Furthermore, with the MFP 1 as described above, the first content, the code symbols 85, and the reference numerals 87 can be printed as the objects 83 and the code symbols 85 are assigned identical reference numerals 87 so that the correspondence between the objects 83 and the code symbols 85 can be easily recognized on the printed output.

Although examples of carrying out the invention have been described, those skilled in the art will appreciate that there are numerous variations and permutations of the printing system and the program therefor that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the two-dimensional code symbol used in the embodiment described above may be replaced with a one-dimensional barcode symbol. Further, the code symbol may not be limited to the QR code, but may be another form of two-dimensional code symbol.

Further, in the embodiment described above, the control unit 11 and the printing unit 17 to be controlled thereby are included in the MFP 1 as one unit, however, a computer system having a printer and a PC to control the printer, which are interconnected via a communication interface, may be replaced with the MFP 1.

Furthermore, the printing system is embedded in the MFP 1 having the telephone (audio communication) function, the scanner function, the printing function, the copying function, and the facsimile transmission/reproduction function. However, the MFP 1 may be replaced with an apparatus having a printing function, which may be equipped with the printing function solely or may be equipped with one or more of the plurality of functions in addition to the printing function.

What is claimed is:

1. A non-transitory computer readable medium storing computer readable instructions to control a computer to execute steps of:

obtaining a content to be printed from a content server, the content including a link destination address, the link destination address being an address assigned to information associated with the content to be printed;
detecting the link destination address from the obtained content to be printed, the detecting the link destination address being performed by a detector;
judging as to whether an address assigned to the content to be printed as a link source address and the link destination address respectively indicate locations in different servers;
generating a code symbol, the code symbol representing the detected link destination address being generated from the link destination address detected by the detector and the link source address being an address of the content, in which the detector detected the link destination address, in a format recognizable to a code symbol reader, the code symbol being an image, the generating the code symbol being performed by a code symbol generator,
wherein generating the code symbol when judging that the link source address and the link destination address respectively indicate locations in different servers; and
controlling a printer to print the content along with the generated code symbol.

2. A printing system, comprising:
a content server that is configured to deliver a content to a client device, the content including a link destination address, the link destination address being an address assigned to information associated with the content;
an address judging system that is configured to judge as to whether an address assigned to the content to be printed as a link source address and the link destination address respectively indicate locations in different servers; and
a printer that is configured to print an image representing the content delivered by the content server;
wherein the printer includes:
 a detector that is configured to detect, from the delivered content, the link destination address included in the delivered content to be printed;
 a code symbol generator that is configured to generate a code symbol, the code symbol representing the detected link destination address and the link source address,
 wherein the link destination address to be represented in the code symbol is the link destination address detected by the detector from the content to be printed and the link source address is an address of the delivered content and is different from the detected link destination address, in a format recognizable to a code symbol reader, and the code symbol is an image,
 wherein the code symbol generator generates the code symbol when the address judging system judges that the link source address and the link destination address respectively indicate locations in different servers; and
 a print controller that is configured to print the delivered content along with the code symbol generated in the code symbol generator.

3. The printing system according to claim 2, further comprising:
an existing code symbol judging system that is configured to judge as to whether the code symbol representing the link destination address detected by the detector in the format recognizable to the code symbol reader exists in the content,
wherein the code symbol generator generates the code symbol representing the link destination address in the format recognizable to the code symbol reader when the existing code symbol judging system judges that the code symbol does not exist in the content.

4. The printing system according to claim 2, wherein the print controller appends the code symbol generated by the code symbol generator in a position wherein the code symbol accompanies an object in the content with the link destination address attached thereto and controls the printer to print the content along with the appended code symbol.

5. The printing system according to claim 2,
wherein the print controller appends the code symbol generated by the code symbol generator in an area which is different from an area wherein the content is provided and controls the printer to print the content along with the appended code symbol.

6. The printing system according to claim 2, wherein the print controller appends reference symbols indicating a correspondence between an object with the link destination address attached thereto and the code symbol generated by the code symbol generator respectively to the object and the code symbol and controls the printer to print the content along with the code symbol and the reference symbols.

7. The printing system according to claim 2, further comprising:
an object address that is assigned to an object and represents a location of the object in the network, and
wherein the code symbol generator generates the code symbol representing the link destination address, the link source address, and the object address.

8. A printing system, comprising:
a printer that is configured to print an image representing a content, the content including a link destination address, the link destination address being an address assigned to information associated with the content;
an address judging system that is configured to judge as to whether an address assigned to the content to be printed as a link source address and the link destination address respectively indicate locations in different servers; and
a print controller that is configured to control the printer,
wherein the print controller includes:
 a detector that is configured to detect, from the delivered content, the link destination address included in the delivered content to be printed; and
 a code symbol generator that is configured to generate a code symbol, the code symbol representing the detected link destination address and the link source address, wherein link destination address to be represented in the code symbol is the link destination address detected by the detector from the content to be printed and the link source address is an address of the content and is different from the detected link destination address, in a format recognizable to a codes symbol reader, and the code symbol is an image,
 wherein the code symbol generator generates the code symbol when the address judging system judges that the link source address and the link destination address respectively indicate locations in different servers, and
 wherein the print controller is configured to print the delivered content along with the code symbol generated in the code symbol generator.

9. The printing system according to claim 8, further comprising:
an address judging system that is configured to judge as to whether an address assigned to the content to be printed as the link source address and the link destination address respectively indicate locations in different servers, wherein the code symbol generator generates the code symbol when the address judging system judges that the link source address and the link destination address respectively indicate locations in different servers.

10. The printing system according to claim 8, further comprising:

an existing code symbol judging system that is configured to judge as to whether the code symbol representing the link destination address detected by the detector in the format recognizable to the code symbol reader exists in the content, wherein the code symbol generator generates the code symbol representing the link destination address in the format recognizable to the code symbol reader when the existing code symbol judging system judges that the code symbol does not exist in the content.

11. The printing system according to claim 8, wherein the print controller appends the code symbol generated by the code symbol generator in a position wherein the code symbol accompanies an object in the content with the link destination address attached thereto and controls the printer to print the content along with the appended code symbol.

12. The printing system according to claim 8, wherein the print controller appends the code symbol generated by the code symbol generator in an area which is different from an area wherein the content is provided and controls the printer to print the content along with the appended code symbol.

13. The printing system according to claim 8, wherein the print controller appends reference symbols indicating a correspondence between an object with the link destination address attached thereto and the code symbol generated by the code symbol generator respectively to the object and the code symbol and controls the printer to print the content along with the code symbol and the reference symbols.

14. The printing system according to claim 8, further comprising:

an object address that is assigned to an object and represents a location of the object in the network, and wherein the code symbol generator generates the code symbol representing the link destination address, the link source address, and the object address.

* * * * *